United States Patent
Jacobsen et al.

(10) Patent No.: US 6,545,654 B2
(45) Date of Patent: *Apr. 8, 2003

(54) MICRODISPLAY FOR PORTABLE COMMUNICATION SYSTEMS

(75) Inventors: Jeffrey Jacobsen, Hollister, CA (US); John C. C. Fan, Chestnut Hill, MA (US); Stephen Pombo, Sunnyvale, CA (US); Matthew Zavracky, Plympton, MA (US); Rodney Bumgardner, Cupertino, CA (US)

(73) Assignee: Kopin Corporation, Taunton, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/741,671

(22) Filed: Oct. 31, 1996

(65) Prior Publication Data

US 2002/0057236 A1 May 16, 2002

(51) Int. Cl.⁷ .................................. G09G 3/36
(52) U.S. Cl. ....................... 345/87; 345/95; 345/96; 345/100
(58) Field of Search .......................... 345/87, 92, 32, 345/91, 95, 96, 100, 7–8; 349/5, 6; 379/53, 58, 110; 257/13; 359/59; 40/825.44; 437/86

(56) References Cited

U.S. PATENT DOCUMENTS

| 4,159,417 A | 6/1979 | Rubincam | 235/375 |
| 4,254,451 A | 3/1981 | Cochran, Jr. | 362/103 |
| 4,516,157 A | 5/1985 | Campbell | 358/108 |
| 4,583,122 A | 4/1986 | Ohwada et al. | 358/213 |
| 4,605,959 A | 8/1986 | Colbaugh | 358/93 |
| 4,621,261 A | 11/1986 | Hehlen et al. | 340/825.52 |
| 4,782,340 A | 11/1988 | Czubatyj et al. | 340/825 |
| 4,838,654 A | 6/1989 | Hamaguchi et al. | 350/333 |

(List continued on next page.)

FOREIGN PATENT DOCUMENTS

| CA | 2123461 | 11/1994 |
| DE | 27 15 446 | 10/1978 |
| DE | 28 20 096 | 11/1979 |

(List continued on next page.)

OTHER PUBLICATIONS

Hand–held Videophone, *Popular Science* (Feb. 1992).

VideoPhone price cut to $1,000, *USA Today* (Jan. 2, 1993).

SA620 Integrated Front–End, *Philips Electronics North America Corp.* (1993).

Primary Examiner—Vijay Shankar
Assistant Examiner—Mansour M. Said
(74) Attorney, Agent, or Firm—Hamilton, Brook, Smith & Reynolds, P.C.

(57) ABSTRACT

The invention relates to a microdisplay system that utilizes a small high resolution active matrix liquid crystal display with an illumination system and a magnifying optical system to provide a hand held communication display device. The system can employ an LED illumination system and cellular communication or processor circuits within a compact housing to provide communication devices such as pagers, telephones, televisions, and hand held computer devices with a compact high resolution video display.

47 Claims, 17 Drawing Sheets

U.S. PATENT DOCUMENTS

| | | | |
|---|---|---|---|
| 4,850,009 A | 7/1989 | Zook et al. | 379/96 |
| 4,855,725 A | 8/1989 | Fernandez | 340/706 |
| 4,859,031 A | 8/1989 | Berman et al. | 350/174 |
| 4,882,617 A | 11/1989 | Vriens | 358/60 |
| 4,917,469 A | 4/1990 | Ross | 350/332 |
| 4,945,350 A | 7/1990 | Kawamura | 340/784 |
| 4,958,915 A | 9/1990 | Okada et al. | 350/345 |
| 4,962,376 A | 10/1990 | Inoue et al. | 340/784 |
| 4,963,001 A | 10/1990 | Miyajima | 350/331 R |
| 4,975,694 A | 12/1990 | McLaughlin et al. | 340/825.44 |
| 4,980,774 A | 12/1990 | Brody | 358/241 |
| 4,985,697 A | 1/1991 | Boulton | 340/750 |
| 4,997,263 A | 3/1991 | Cohen et al. | 350/345 |
| 5,034,809 A | 7/1991 | Katoh | 358/88 |
| 5,087,113 A | 2/1992 | Sakono et al. | 359/59 |
| 5,088,806 A | 2/1992 | McCartney et al. | 359/84 |
| 5,093,655 A | 3/1992 | Tanioka et al. | 340/784 |
| 5,108,172 A | 4/1992 | Flasck | 353/31 |
| 5,130,794 A | 7/1992 | Ritchey | 358/87 |
| 5,166,814 A | 11/1992 | Jacobs et al. | 359/40 |
| 5,170,427 A | 12/1992 | Guichard et al. | 379/53 |
| 5,199,104 A | 3/1993 | Hirayama | 395/145 |
| 5,204,660 A | 4/1993 | Kamagami et al. | 340/784 |
| 5,239,665 A | 8/1993 | Tsuchiya | 395/800 |
| 5,250,937 A | 10/1993 | Kikuo et al. | 345/89 |
| 5,280,372 A | 1/1994 | Horiuchi | 359/49 |
| 5,300,976 A * | 4/1994 | Lim et al. | 354/219 |
| 5,528,285 A * | 4/1994 | Morikawa et al. | 348/14 |
| 5,331,333 A * | 7/1994 | Tagawa et al. | 345/7 |
| 5,334,821 A | 8/1994 | Campo et al. | 235/380 |
| 5,337,068 A | 8/1994 | Stewart et al. | 345/88 |
| 5,347,154 A | 9/1994 | Takahashi et al. | 257/347 |
| 5,392,158 A | 2/1995 | Tosaki | 359/633 |
| 5,392,462 A | 2/1995 | Komaki | 455/89 |
| 5,398,043 A | 3/1995 | Takeda et al. | 345/94 |
| 5,402,143 A | 3/1995 | Ge et al. | 345/102 |
| 5,408,344 A | 4/1995 | Takiguchi et al. | 359/40 |
| 5,416,496 A | 5/1995 | Wood | 345/102 |
| 5,436,635 A | 7/1995 | Takahara et al. | 345/92 |
| 5,440,197 A | 8/1995 | Gleckman | 313/110 |
| 5,467,215 A | 11/1995 | Lebby et al. | 359/247 |
| 5,475,399 A | 12/1995 | Borsuk | 345/130 |
| 5,486,946 A | 1/1996 | Jachimowicz et al. | 359/263 |
| 5,491,507 A | 2/1996 | Umezawa et al. | 348/14 |
| 5,495,287 A | 2/1996 | Kasai et al. | 345/89 |
| 5,499,138 A | 3/1996 | Iba | 359/569 |
| 5,528,397 A | 6/1996 | Zavracky et al. | 359/59 |
| 5,539,554 A | 7/1996 | Lebby et al. | 359/83 |
| 5,539,578 A | 7/1996 | Togino et al. | 359/630 |
| 5,548,271 A * | 8/1996 | Tsuchiyama et al. | 340/311.1 |
| 5,550,754 A | 8/1996 | McNelley et al. | 364/514 |
| 5,568,185 A | 10/1996 | Yoshikazu | 348/22 |
| 5,577,492 A | 11/1996 | Parkyn, Jr. et al. | 126/698 |
| 5,581,271 A | 12/1996 | Kraemer | 345/8 |
| 5,627,560 A | 5/1997 | Verhulst | 345/97 |
| 5,634,080 A | 5/1997 | Kikinis et al. | 395/893 |
| 5,637,187 A | 6/1997 | Takasu et al. | 438/30 |
| 5,640,174 A | 6/1997 | Kamei et al. | 345/89 |
| 5,648,860 A | 7/1997 | Ooi et al. | 349/10 |
| 5,655,832 A | 8/1997 | Pelka et al. | 362/296 |
| 5,661,635 A | 8/1997 | Huffman et al. | 361/684 |
| 5,666,133 A | 9/1997 | Matsuo et al. | 345/100 |
| 5,673,059 A * | 9/1997 | Zavracky et al. | 345/8 |
| 5,677,727 A | 10/1997 | Gotoh et al. | 348/14 |
| 5,682,214 A * | 10/1997 | Amako et al. | 349/74 |
| 5,684,354 A | 11/1997 | Gleckman | 313/110 |
| 5,689,283 A | 11/1997 | Shirochi | 345/132 |
| 5,691,783 A | 11/1997 | Numao et al. | 349/48 |
| 5,694,147 A | 12/1997 | Gaalema et al. | 345/101 |
| 5,719,936 A | 2/1998 | Hillenmayer | 379/447 |
| 5,726,671 A * | 3/1998 | Ansley et al. | 345/8 |
| 5,734,875 A | 3/1998 | Cheng | 395/516 |
| 5,746,493 A | 5/1998 | Jönsson et al. | 362/31 |
| 5,748,160 A | 5/1998 | Shieh et al. | 345/82 |
| 5,751,261 A | 5/1998 | Zavracky et al. | 345/55 |
| 5,754,227 A * | 5/1998 | Fukuoka | 348/232 |
| 5,757,445 A | 5/1998 | Vu et al. | 349/45 |
| 5,761,485 A | 6/1998 | Munyan | 395/500 |
| 5,763,862 A | 6/1998 | Jachimowicz et al. | 235/380 |
| 5,777,594 A | 7/1998 | Miyawaki | 345/102 |
| 5,797,089 A | 8/1998 | Nguyen | 455/403 |
| 5,806,950 A | 9/1998 | Gale et al. | 353/78 |
| 5,812,101 A * | 9/1998 | Monarchie et al. | 345/8 |
| 5,812,149 A | 9/1998 | Kawasaki et al. | 345/516 |
| 5,815,126 A * | 9/1998 | Fan et al. | 345/8 |
| 5,815,228 A | 9/1998 | Flynn | 349/71 |
| 5,822,021 A | 10/1998 | Johnson et al. | 348/742 |
| 5,825,408 A | 10/1998 | Yuyama et al. | 348/14 |
| 5,828,427 A | 10/1998 | Faris | 349/5 |
| 5,867,795 A | 2/1999 | Novis et al. | 455/566 |
| 5,889,567 A | 3/1999 | Swanson et al. | 349/62 |
| 5,892,325 A | 4/1999 | Gleckman | 313/578 |
| 5,897,184 A | 4/1999 | Eichenlaub et al. | 349/64 |
| 5,926,161 A | 7/1999 | Furuhashi et al. | 345/100 |
| 5,929,950 A | 7/1999 | Matsuda | 349/60 |
| 5,929,958 A | 7/1999 | Ohta et al. | 349/141 |
| 5,940,159 A | 8/1999 | Alvelda | 349/202 |
| 6,027,958 A | 2/2000 | Vu et al. | 438/110 |
| 6,043,591 A | 3/2000 | Gleckman | 313/110 |
| 6,073,034 A | 6/2000 | Jacobsen et al. | 455/566 |
| 6,151,004 A | 11/2000 | Kaneko | 345/88 |
| 6,205,199 B1 | 3/2001 | Polichar et al. | 378/98.8 |
| 6,232,937 B1 * | 5/2001 | Jacobsen et al. | 345/87 |

FOREIGN PATENT DOCUMENTS

| | | | |
|---|---|---|---|
| DE | 38 28 485 A1 | 3/1990 | |
| DE | 92 00 683.3 | 6/1992 | |
| EP | 0 172 473 A2 | 2/1986 | |
| EP | 0 344 881 A2 | 12/1989 | |
| EP | 0 352 914 A2 | 1/1990 | |
| EP | 0 424 880 A2 | 5/1991 | |
| EP | 0 438 362 A1 | 7/1991 | |
| EP | 0 464 011 A1 | 1/1992 | |
| EP | 0 472 361 A2 | 2/1992 | |
| EP | 0 491 639 A1 | 6/1992 | |
| EP | 0 526 802 A2 | 2/1993 | |
| EP | 0 535 401 A1 | 4/1993 | |
| EP | 0 539 699 A2 | 5/1993 | |
| EP | 0 539 907 A3 | 5/1993 | |
| EP | 0 547 493 A1 | 6/1993 | |
| EP | 0 551 781 A1 | 7/1993 | |
| EP | 0 626 773 A1 | 11/1994 | |
| EP | 0 626 773 B1 | 11/1994 | |
| EP | 0 631 289 A2 A3 | 12/1994 | |
| EP | 0 689 350 A2 | 12/1995 | |
| EP | 0 704 788 A2 | 4/1996 | |
| EP | 0 732 606 A2 | 9/1996 | |
| EP | 0 817 393 A2 | 1/1998 | |
| FR | 2612351 | 9/1988 | |
| GB | 2149554 A * | 6/1985 | G09F/9/35 |
| GB | 2 242 335 A | 9/1991 | |
| GB | 2 289 555 A | 11/1995 | |
| GB | 2 308 486 A | 6/1997 | |
| JP | 61-139177 | 6/1986 | |
| JP | 62-91045 | 4/1987 | |
| JP | 63-151283 | 6/1988 | |
| JP | 1-160286 | 6/1989 | |
| JP | 2-113656 | 4/1990 | |
| JP | 2-196570 | 8/1990 | |
| JP | 2-218251 | 8/1990 | |
| JP | 3-53785 | 3/1991 | |

| | | | | | | |
|---|---|---|---|---|---|---|
| JP | 3-105383 | 5/1991 | | WO | 92/12453 | 7/1992 |
| JP | 3-136487 | 6/1991 | | WO | 93/01583 | 1/1993 |
| JP | 5-14550 | 1/1993 | | WO | 93/16550 | 8/1993 |
| JP | 5-252523 | 9/1993 | | WO | 93/18428 | 9/1993 |
| JP | 141308 | 5/1994 | | WO | 93/23783 | 11/1993 |
| JP | 6-123852 | 5/1994 | | WO | 94/01958 | 1/1994 |
| JP | 7-177398 | 1/1995 | | WO | 94/09398 | 4/1994 |
| JP | 7-235892 | 9/1995 | | WO | 94/11775 | 5/1994 |
| JP | 8-76078 | 3/1996 | | WO | 94/14152 | 6/1994 |
| JP | 8-95027 | 4/1996 | | WO | 95/11473 | 4/1995 |
| JP | 8-102877 | 4/1996 | | WO | 95/25983 | 9/1995 |
| JP | 8-114783 | 5/1996 | | WO | 95/26110 | 9/1995 |
| JP | 8-129157 | 5/1996 | | WO | 96/19794 | 6/1996 |
| JP | 8-149346 | 6/1996 | | WO | 96/21173 | 7/1996 |
| JP | 8-149485 | 6/1996 | | WO | 96/21205 | 7/1996 |
| JP | 8-154190 | 6/1996 | | WO | 96/24197 | 8/1996 |
| JP | 8-248499 | 9/1996 | | WO | 96/35288 | 11/1996 |
| JP | 8-340546 | 12/1996 | | WO | 97/01240 | 1/1997 |
| JP | 9-26617 | 1/1997 | | | | |
| JP | 9-55872 | 2/1997 | | * cited by examiner | | |

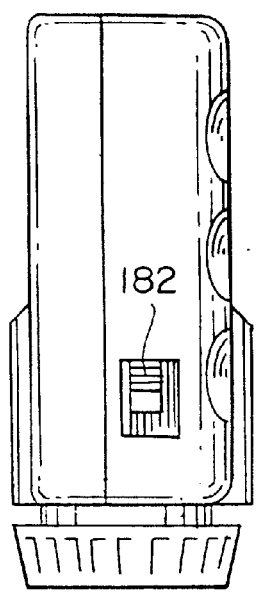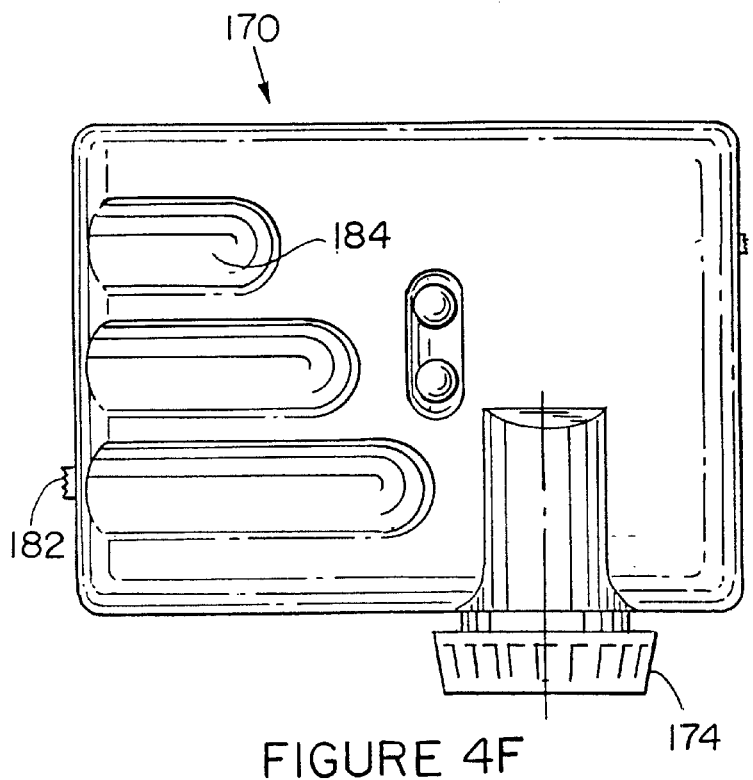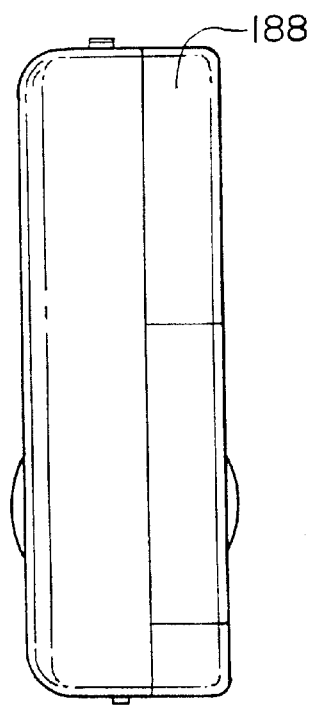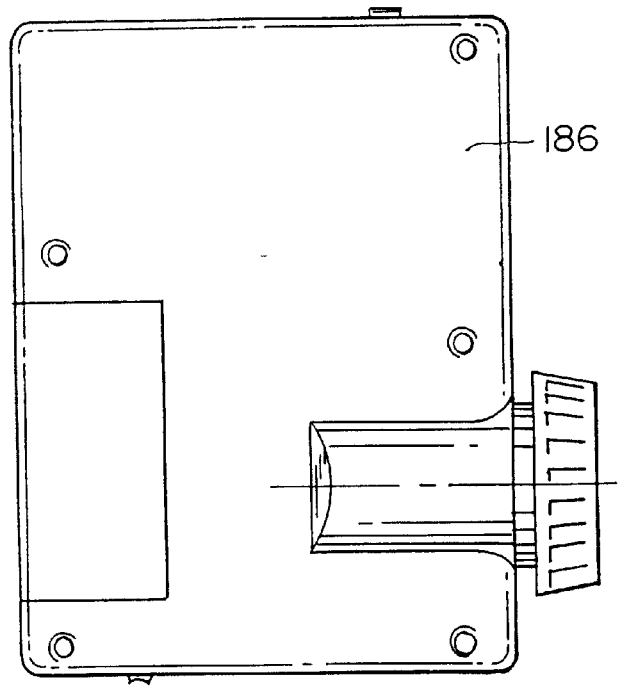
FIGURE 4G    FIGURE 4F
FIGURE 4H    FIGURE 4I

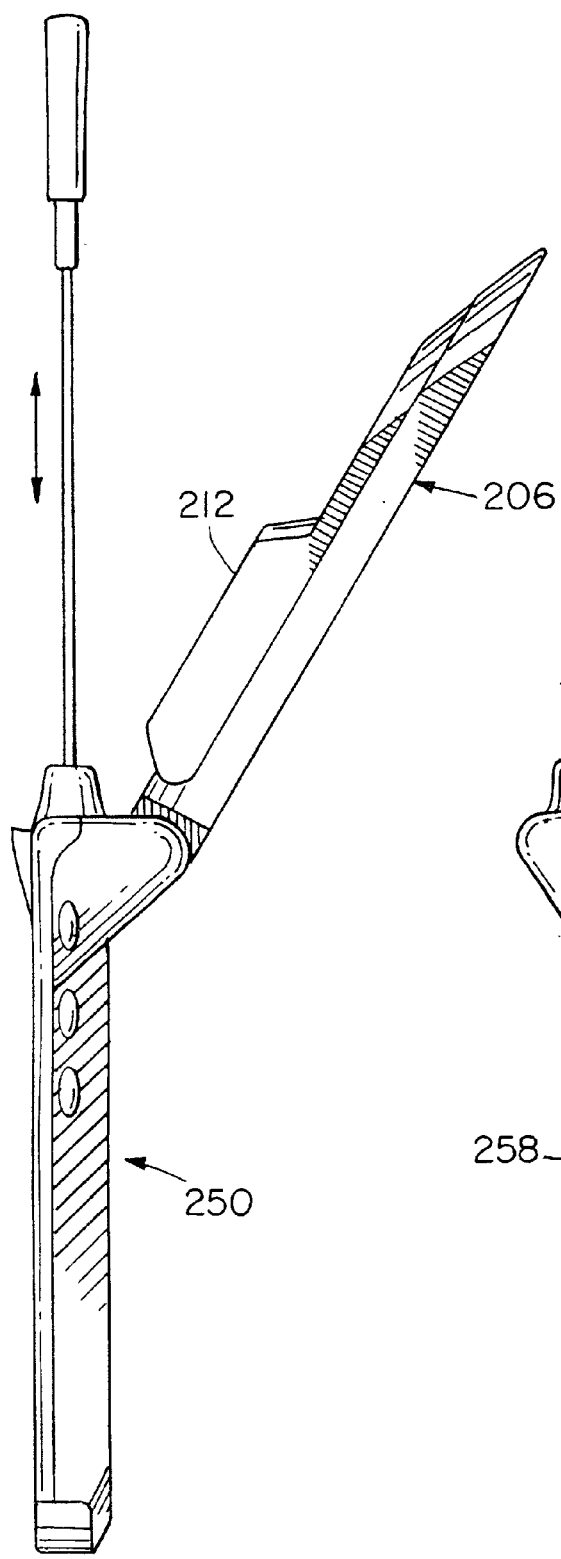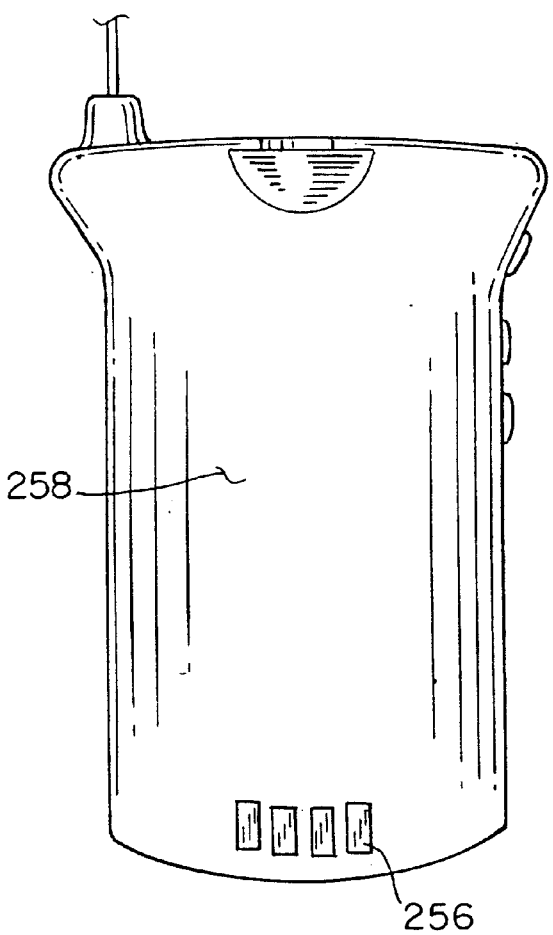
FIGURE 9C
FIGURE 9D

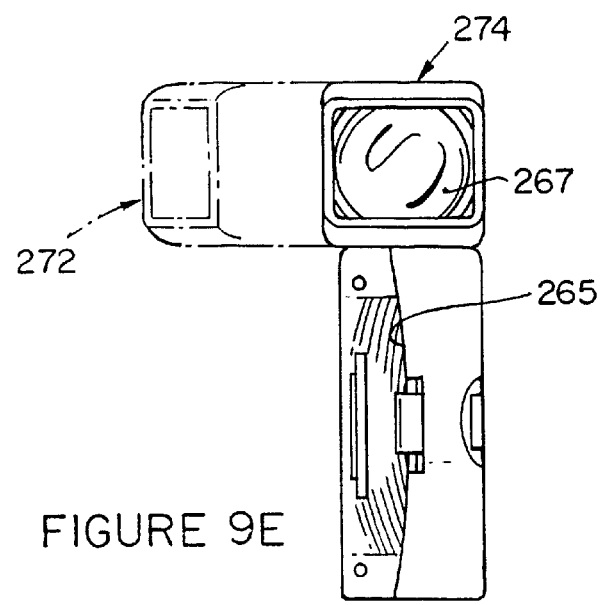
FIGURE 9E
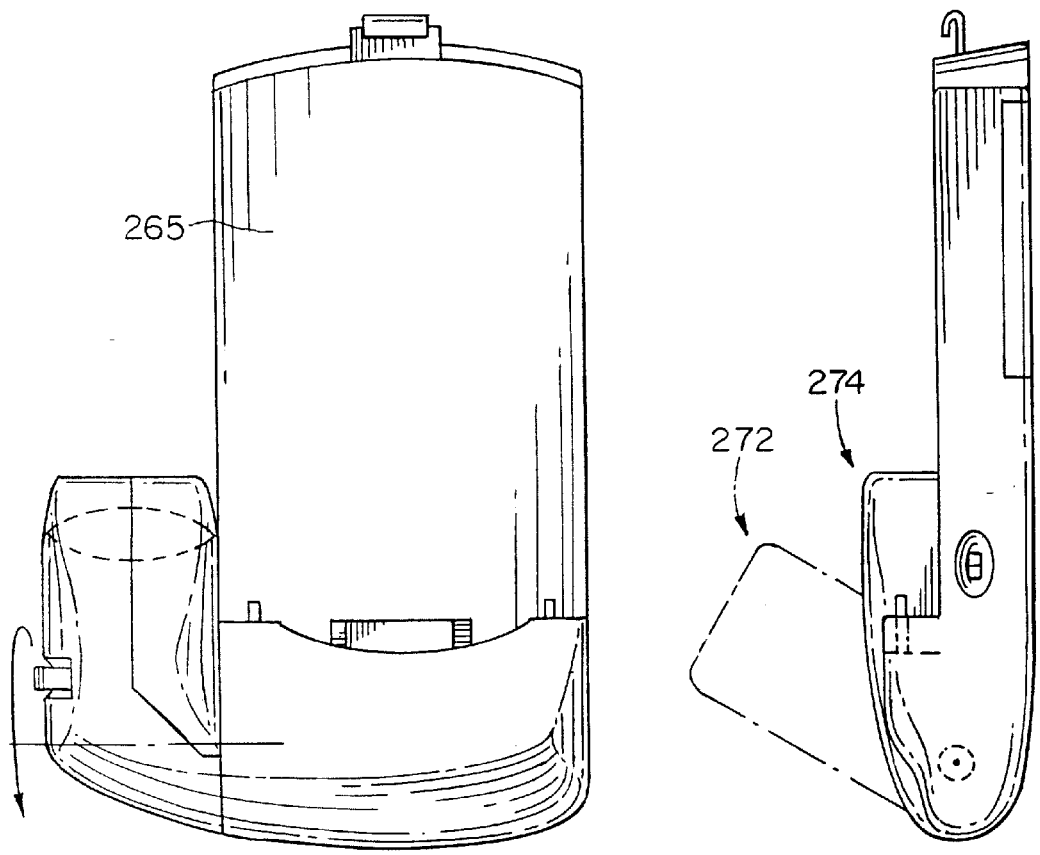
FIGURE 9F
FIGURE 9G

MICRODISPLAY FOR PORTABLE COMMUNICATION SYSTEMS

BACKGROUND OF THE INVENTION

Flat-panel displays are being developed which utilize liquid crystals or electroluminescent materials to produce high quality images. These displays are expected to supplant cathode ray tube (CRT) technology and provide a more highly defined television picture or computer monitor image. The most promising route to large scale high quality liquid crystal displays (LCDs), for example, is the active-matrix approach in which thin-film transistors (TFTs) are co-located with LCD pixels. The primary advantage of the active matrix approach using TFTs is the elimination of cross-talk between pixels, and the excellent grey scale that can be attained with TFT-compatible LCDs.

Flat panel displays employing LCDs generally include five different layers: a white light source, a first polarizing filter that is mounted on one side of a circuit panel on which the TFTs are arrayed to form pixels, a filter plate containing at least three primary colors arranged into pixels, and finally a second polarizing filter. A volume between the circuit panel and the filter plate is filled with a liquid crystal material. This material will allow transmission of light in the material when an electric field is applied across the material between the circuit panel and a ground affixed to the filter plate. Thus, when a particular pixel of the display is turned on by the TFTs, the liquid crystal material rotates polarized light being transmitted through the material so that the light will pass through the second polarizing filter.

The primary approach to TFT formation over the large areas required for flat panel displays has involved the use of amorphous silicon, which has previously been developed for large-area photovoltaic devices. Although the TFT approach has proven to be feasible, the use of amorphous silicon compromises certain aspects of the panel performance. For example, amorphous silicon TFTs lack the frequency response needed for high performance displays due to the low electron mobility inherent in amorphous material. Thus the use of amorphous silicon limits display speed, and is also unsuitable for the fast logic needed to drive the display.

As the display resolution increases, the required clock rate to drive the pixels also increases. In addition, the advent of colored displays places additional speed requirements on the display panel. To produce a sequential color display, the display panel is triple scanned, once for each primary color. For example, to produce color frames at 20 Hz, the active matrix must be driven at a frequency of 60 Hz. In brighter ambient light conditions, the active matrix may need to be driven at 180 Hz to produce a 60 Hz color image. At over 60 Hz, visible flicker is reduced.

Owing to the limitations of amorphous silicon, other alternative materials include polycrystalline silicon, or laser recrystallized silicon. These materials are limited as they use silicon that is already on glass, which generally restricts further circuit processing to low temperatures.

Integrated circuits for displays, such as, the above referred color sequential display, are becoming more and more complex. For example, the color sequential display is designed for displaying High Definition Television (HDTV) formats requiring a 1280-by-1024 pixel array with a pixel pitch, or the distance between lines connecting adjacent columns or rows of pixel electrodes, being in the range of 15–55 microns, and fabricated on a single five-inch wafer.

SUMMARY OF THE INVENTION

In accordance with the invention, the cost and complexity of high resolution displays is significantly reduced by fabricating multiple integrated displays of reduced size on a single wafer and then dicing the wafer to produce a plurality of display devices.

The displays are then assembled with appropriate magnifying optics to form a portable display system of low cost and reduced size. Included in the optics is a magnification system which compensates for the small image size by magnifying and projecting the image at an appropriate distance for viewing.

In preferred embodiments, the microdisplay, because of its small size and weight, can be used as a hand-held communication system such as a pager, a wireless mobile telephone, or alternatively, as a head-mounted display. The display can provide a visual display suitable for data, graphics or video and accommodate standard television or high definition television signals. The system can optionally include circuitry for cellular reception and transmission of facsimile communications, can be voice activated, can include a mouse operated function, provide internet access, and can have a keyboard or touch pad for numeric or alphabetic entry. The telephone or hand-held unit can be equiped with a camera or solid state imaging sensor so that images can be generated and transmitted to a remote location and/or viewed on the display. Also the telephone user can call to access a particular computer at a remote location, present the computer screen on the micro display, access specific files in the computer memory and download data from the file into a memory within the telephone or a modular memory and display unit connected to the telephone. The telephone can be connected to a local computer or display and the data from the file can be loaded into the local memory.

In a preferred embodiment of the invention, a light emitting diode (LED) device is used to illuminate the display. For transmission displays the LED device operates as a backlight and can include a diffuser. An LED device can also be used as a light source for a reflective display in another preferred embodiment of the invention. The displays are preferably liquid crystal displays using a nematic liquid crystal material. Consequently, controlling the time domain is not necessary to obtain grey scale.

For the purposes of this application, a microdisplay is defined as a display having at least 75,000 pixel electrodes and an active area of less than 158 mm$^2$, where the active area of the display is the area of the active matrix circuit that generates an image, including all of the pixel electrodes but not including the driver electronics and the border area for bonding and sealing of the liquid crystal display. For example, the array can be at least 320×240, 640×480 or higher. A preferred embodiment of the microdisplay has an active area of 100 mm$^2$ or less, and is preferably in the range between 5 mm$^2$ and 80 mm$^2$. The pixel pitch for these displays is in the range of 5–30 microns and preferably in the range between 5 and 18 microns. By utilizing pixel pitches of less than 18 microns smaller high resolution displays are now possible.

For displays of this size and resolution to be read by a user at distances of less than 10 inches (25.4 cm) there are specific lighting and magnification requirements. For a 0.25 inch (6.35 mm) diagonal display, for example, the LED device preferably includes a plurality of LEDS coupled to a diffuser. The lens used to magnify the display image has a field of view in the range of 10–60 degrees, and preferably at least about 16 degrees–22 degrees, an ERD in the range of of about 25 mm–100 mm and an object distance of between about 1.5 and 5 feet (152.4 cm). A color field sequentially operated LED backlight system can use a plurality of LEDS with a two or four sided reflector assembly to concentrate the light through the liquid crystal display. A preferred embodiment can use at least two LEDs, or as many as six or more of each color, to provide the desired brightness level. Alternatively the LEDs can be arranged around the periphery of a transmissive display and directed down into a conical reflector that directs the backlighting through the display in concentrated form.

The display can be operated using a color sequential system as described in U.S. patent application Ser. No. 08/216,817, "Color Sequential Display Panels" filed on Mar. 23, 1994, the entire contents of which is incorporated herein by reference, discloses an active matrix display in which the control electronics is integrated with the active matrix circuitry using single crystal silicon technology. The control electronics provides compressed video information to produce a color image for data, a still image or a video image such as a television image on the display.

The microdisplays described herein can be used in head mounted displays, including color sequential systems as described in greater detail in U.S. application Ser. No. 08/410,124 filed on Mar. 23, 1995, the entire contents of which is incorporated herein by reference. Further details regarding the drive electronics suitable for a microdisplay can be found in U.S. Ser. No. 08/106,416 filed on Aug. 13, 1993, the entire contents of which is incorporated herein by reference. A preferred embodiment of the display control circuit utilizes an "under scanning" feature in which selected pixels are rapidly turned on and off to enhance edge definition and emulate a higher resolution display. The display control circuit can also utilize a panning capability so that a small portion of a displayed image can be selected, by mouse operation for example, and presented using the entire microdisplay image area thereby allowing the user to perceive smaller displayed features. This can also be used to view selected portions of a high resolution image, such as a portion of a 640×480 image on a 320×240 microdisplay.

BRIEF DESCRIPTION OF THE DRAWINGS

The above and other objects and features of the invention will be better understood and appreciated by those skilled in the art in view of the description of the preferred embodiments given below in conjunction with the accompanying drawings, in which:

FIGS. 4A–4I are exterior views of hand-held imaging devices in accordance with the invention.

FIGS. 9A–9J are illustrations of further preferred embodiments of a telephone microdisplay system in accordance with the invention.

DETAILED DESCRIPTION OF THE INVENTION

High Resolution Active Matrix MicroDisplay

Figure 1:
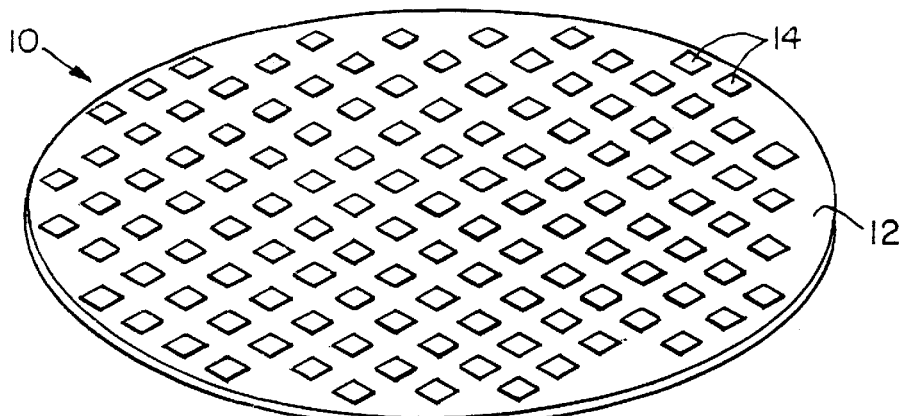
FIG. 1 is a perspective view of a single wafer having a plurality of display devices formed thereon in accordance with the invention.

A preferred embodiment of the invention utilizes a process of making a plurality of flat panel displays 10 in which a large number of active matrix arrays 14 are fabricated on a single wafer 12 as illustrated in connection with FIG. 1. The number of displays fabricated on a single wafer depends upon the size of the wafer and the size of each display. A preferred embodiment of the invention, for example, uses a high resolution display having an imaging area of the display with a diagonal of 0.5 inches (12.7 mm) or less. For a four inch wafer, forty separate displays can be fabricated on a single four inch wafer. Where each display has a diagonal of about 0.25 inches (6.35 mm), 80 displays can be fabricated on a single wafer, over 120 displays can be fabricated on a five inch wafer, and 400 displays can be fabricated on an 8 inch wafer.

By fabricating a large number of small high resolution displays on a single wafer the manufacturing yield can be substantially increased and the cost per display can be substantially reduced.

To obtain monochrome resolutions of at least 75,000 pixels (e.g. a 320×240 array) suitable for displaying an NTSC television signal on a 0.25 inch diagonal display the pixel electrodes are preferably on the order of about 15 microns in width or less. To obtain a monochrome resolution of at least 300,000 pixels (e.g. 640×480 array) on a 0.25 inch diagonal display the pixel electrodes preferably have a width of about 8–10 microns.

These small high resolution displays require magnification such that when held in a user's hand within the range of 0.5 inches to 10 inches of the user's eye, a clear image is provided.

Figure 2:
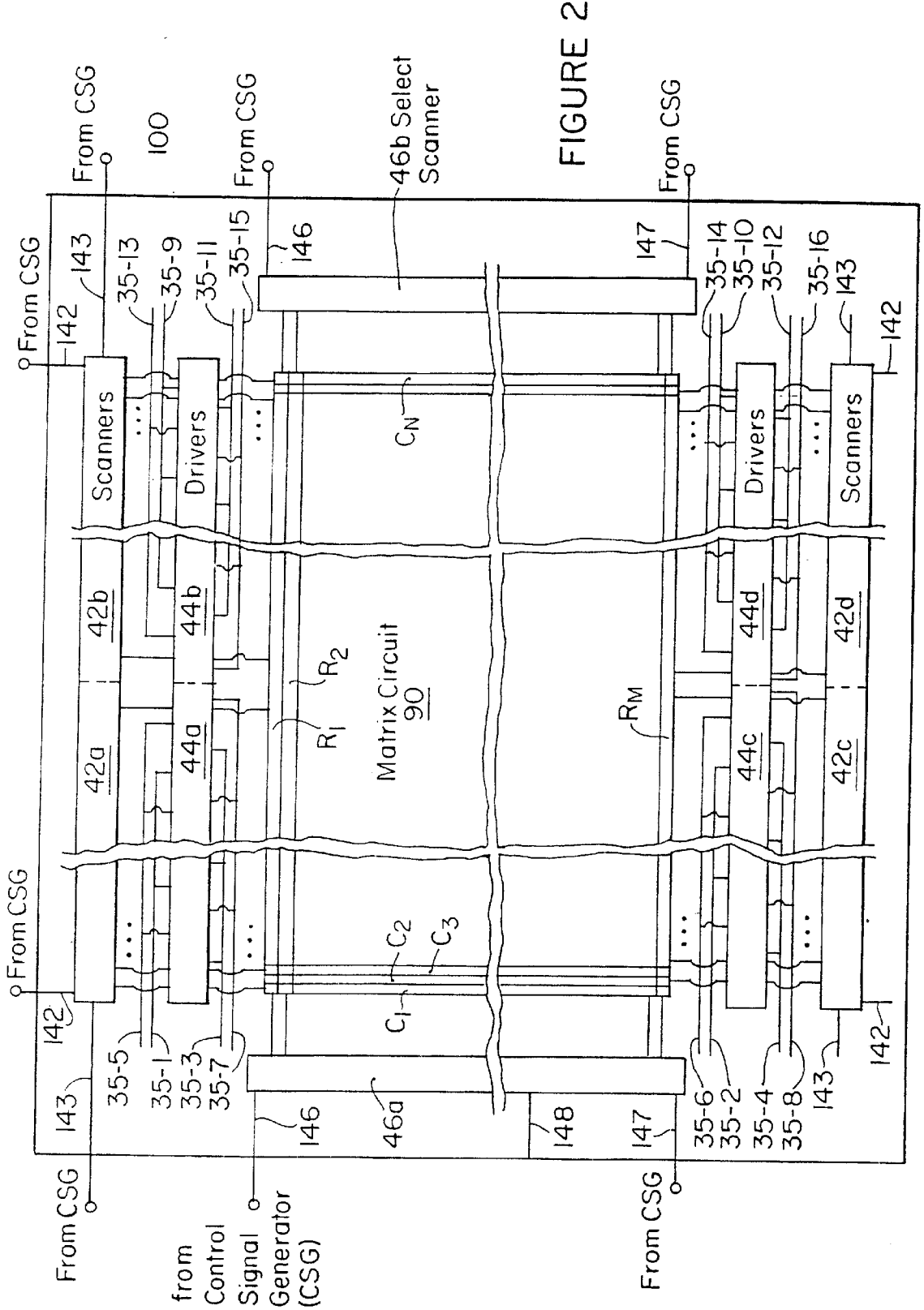
FIG. 2 is a schematic illustration of a die for an integrated active matrix panel display which includes optional control signal circuitry therein.

Referring now to FIG. 2, an integrated circuit active matrix display die is shown schematically which has been diced from a single wafer along with selected number of replicated circuits. Incorporated into the circuit 100 are scanner circuits 42a, 42b, 42c, 42d, along with pixie driven circuits 44a, 44b, 44c, 44d, select scanner circuits 46a, 46b and a display matrix circuit 90.

Further details regarding the fabrication of each die on a wafer can use the methods described in U.S. Pat. No. 5,256,562, the contents of which incorporated herein its entirety by reference.

By fabricating a selected number of circuits 100 on a single wafer, the circuit yield from a single wafer is greatly enhanced at the expense of reduced display area. However, this area disadvantage is overcome by magnifying and projecting the display image as will be described herein.

A video signal bus 35-1 through 35-16 carries analog video signals from digital to analog amplifiers (not shown) to column drivers 44a–d. Because signal interference and signal loss can occur as the analog video signal cross each signal line in the signal bus 35, the channels of video signals are arranged to reduce interference. As illustrated, there are four column drivers 44a–44d, two column drivers 44a, 44b at the top of the active matrix circuit 90 and two column drivers 44c, 44d at the bottom of the active matrix circuit region 90. Each channel is allocated to one of the column drivers 44 such that each column driver 44 receives video from four channels. The top column drivers 44a, 44b receive video from the channels that drive the odd-numbered pixel columns and the bottom coLumn drivers 44c, 44d receive video from the channels that drive the even-numbered columns. As shown, no video signal has to cross the path of more than one other video signal.

The illustrated arrangement of column drivers is particularly suited for edge-to-center and center-to-edge video writing, although the data can also be written from left-to-right or right-to-left. It should be understood that more or less than four column drivers 44 can be employed in preferred embodiments of the invention. For applications having resolutions of 320×240 or 640×480 it is desirable to use single column and row drivers to drive the display. For high speed, high definition displays more can be used to improve performance.

The data scanners 42 a–d are responsive to a pixel data signal 142 and a pixel clock signal 143 from a control signal generator (not shown). The data scanners 42a–d can use a shift register array to store data for each scan. An odd shift register array can be used to store data to odd column pixels and an even shift register array can be used to store data to even column pixels. As illustrated, there are left and right odd data scanners 42a, 42b and left and right even data scanners 42c, 42d.

The column drivers 44 selected by the data scanner 42 transmit video data to a selected column of C pixels in the active matrix circuit 90. The select scanner 46 controlled by a control signal generator determines by control lines which pixels accept this column data.

To reduce signal loss across the active matrix region 90, the select lines are driven from both sides by select scanners 46a and b. As viewed in FIG. 2, a left select scanner 46a and right select scanner 46b are connected to the select data line 146 and the select clock line 147. A third enabling line 148 can also be used for specific applications. The left select scanner 46a provides a select line signal at the end of the select line nearest the lowest-valued pixel column ($C_1$) and right select scanner 46b provides a select line signal at the end of the select line nearest the highest-valued pixel column ($C_N$). Thus, an identical select line signal is supplied at both ends of the select line.

Although static shift registers can be used, the shift registers of the data scanner 42 and the select scanners 46 are preferably implemented as dynamic shift registers. The dynamic shift registers rely on capacitor storage without leakage. However, dynamic shift registers are susceptible to leakage, especially when they are exposed to light. Hence, light shields are needed to protect the scanners 42,46 from exposure to light. Similarly, light shields are also used to protect the transmission gates 44 and pixel columns $C_1$–$C_N$.

For further information regarding the input signals to the circuit 100, reference is made to the above-cited U.S. patents and applications.

In a preferred embodiment of the invention, the panel drive circuitry of FIG. 2 is fabricated as an integrated circuit along with the active matrix circuit 90. The integrated circuitry is preferably fabricated in single crystal silicon having a silicon-on-insulator (SOI) structure using the fabrication and transfer procedures described previously in the aforementioned U.S. Pat. No. 5,256,562. By fabricating the row and column drive circuitry 42, 44, 46 as well as the scanners in single crystal with the active matrix circuit 90, the size of the display panel is not constrained by the connecting pins for the various discrete components. The integrated fabrication also increases the operating speed of the display relative to displays constructed from discrete components. Furthermore, the drive circuitry can be optimized to increase display performance. For example, it is easier to construct a small 1280H×1024V display panel with dual select scanners through integrated fabrication than it is using discrete components.

The pixel electrodes in a preferred embodiment are between 60 and 250 microns square. Consequently, a 1280H×1024V active matrix with the control system can be fabricated such that there are at least 40 such integrated circuits on a five inch wafer, for example, A preferred embodiment in the form of a stand-alone video display device 20 featuring a liquid crystal display incorporating the actual matrix display circuit 100 will now be described in connection with the exploded views of FIGS. 3A and 3B.

Figure 3A:
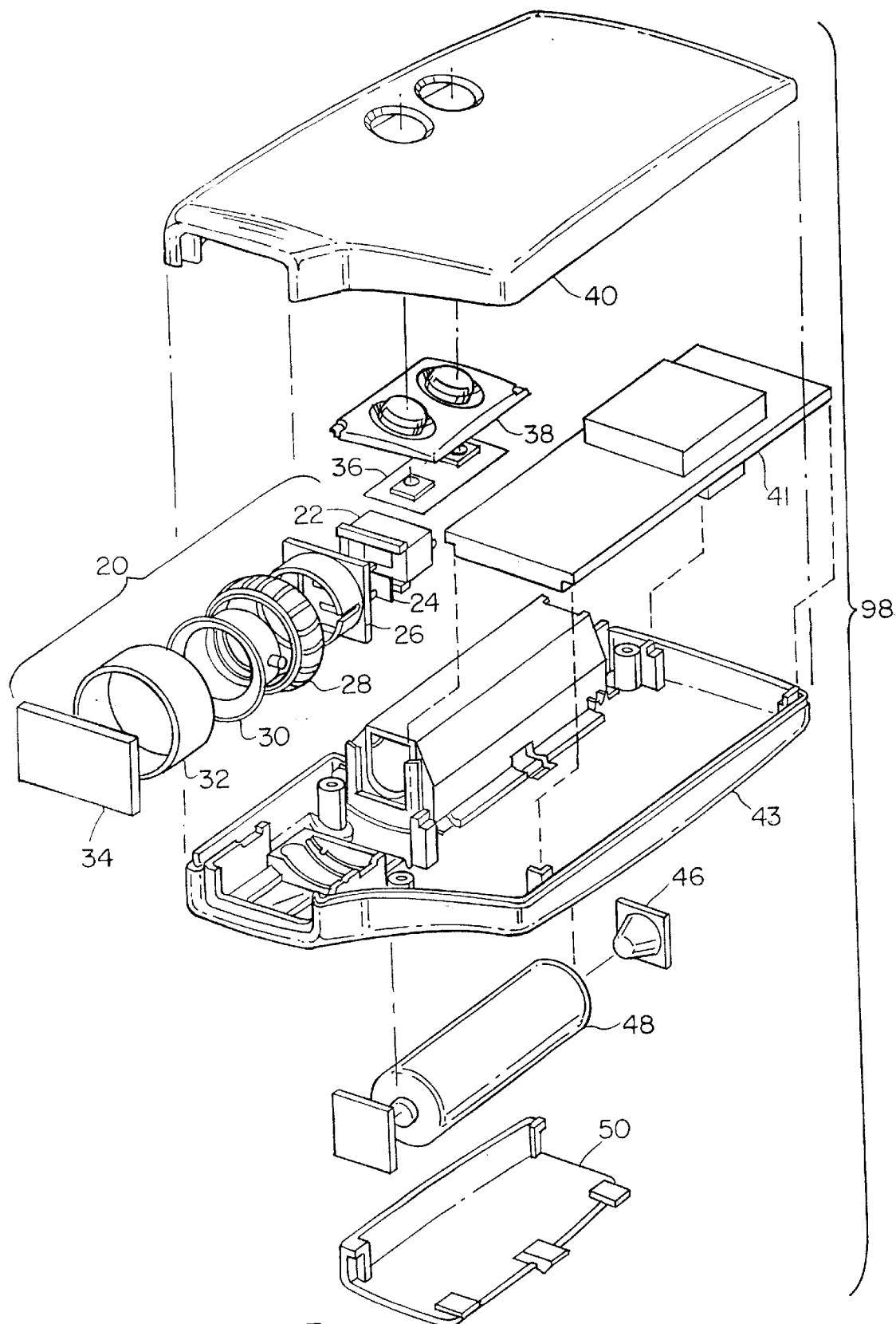
FIGS. 3A and 3B are exploded views of a video display device and pager in accordance with a preferred embodiment of the invention.
Figure 3B:
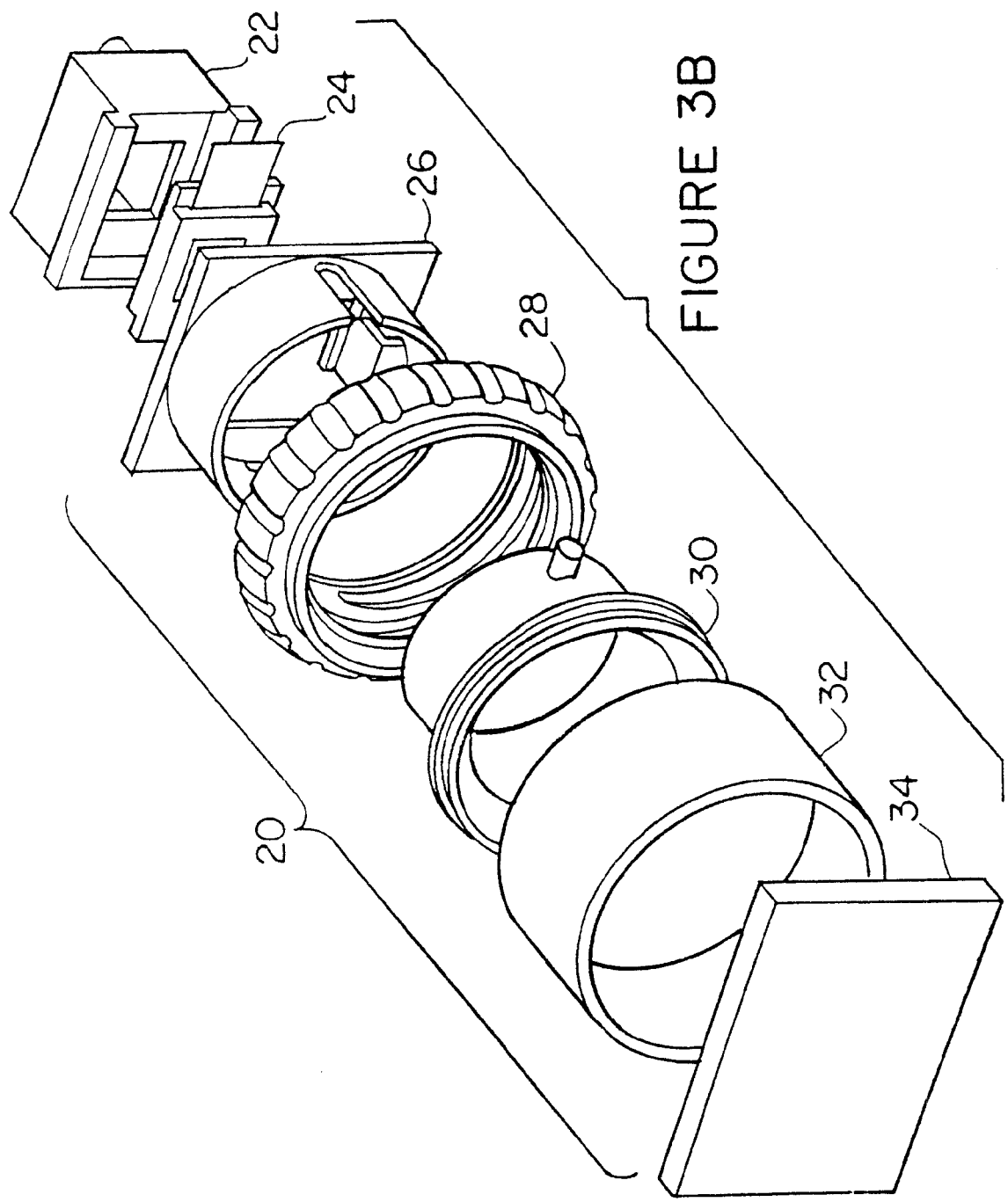

In FIG. 3A, a portable imaging device such as a pager is illustrated having a housing including a top 40 and a bottom 44 with a door 50 for access to a battery 48. The battery 48 provides power to the circuit board 42, the display 24 and the backlight 22. The pager can be operated by controls 38 or push buttons accessible through one of the housing surfaces that actuate display functions. An optical system 20 is positioned within the housing and includes a backlight 22, preferably an LED backlight, a transmission liquid crystal display 24, a focusing mechanism including a knob 28 that the user rotates to move the tunnel 30 relative to the optic slide 26, a lens assembly 32, and a cover glass 34.

Preferred embodiment of hand held display devices are illustrated in connection with FIGS. 4A–4I. FIG. 4A is a perspective view of a preferred embodiment of a pager system 150 having two display viewing areas 152 and 154 within a housing 155. Viewing area 152 has a lens through which the user views a microdisplay as described previously. A second flat panel display without magnification is viewed by the user at 154. The second display is a simple low resolution numeric and/or alphabetic display to read telephone numbers or scrolled numbers or messages. The microdisplay magnification can be adjusted at switch 158. The displays are operated by switches 156, 157. As seen in the rear view of FIG. 4B, the rear surface 162 of housing 155 is thicker in that portion containing the microdisplay and the battery. The sideview of the housing 155 shown in FIG. 4C illustrates a clip 160 that is used to fasten the device to the clothing of the user. The clip 160 is attached to the bottom surface 164 of the housing 155.

Figure 4E:
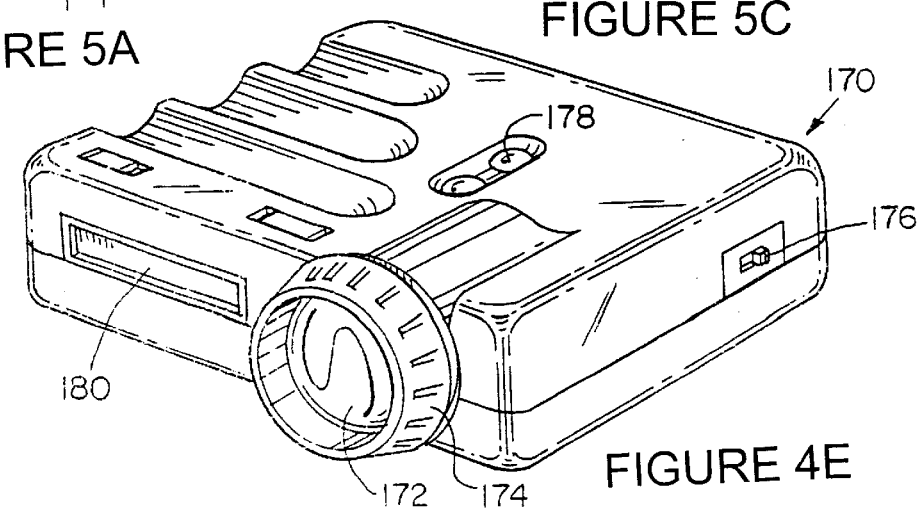
Figure 4A:
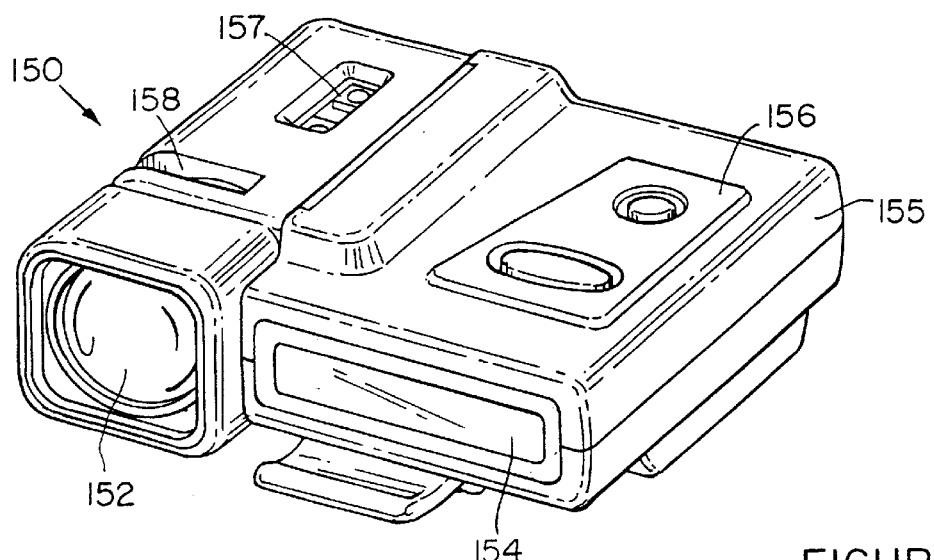
Figure 4C:
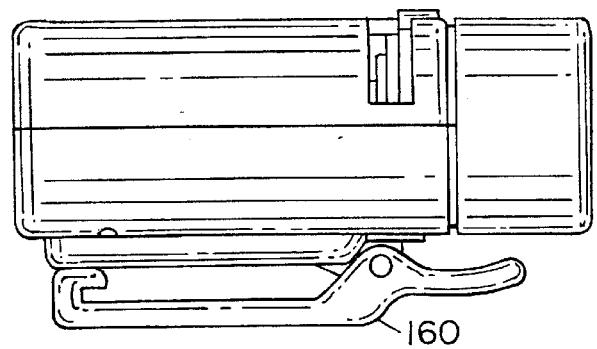
Figure 4B:
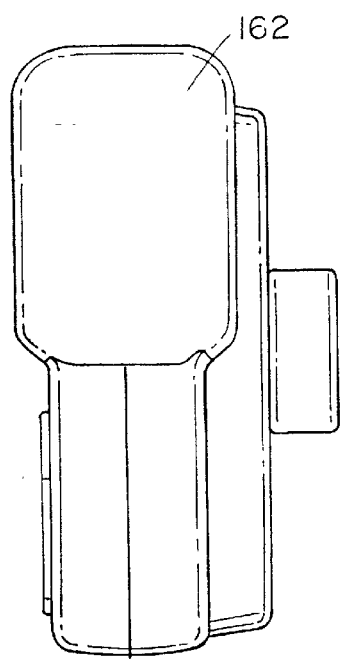
Figure 4D:
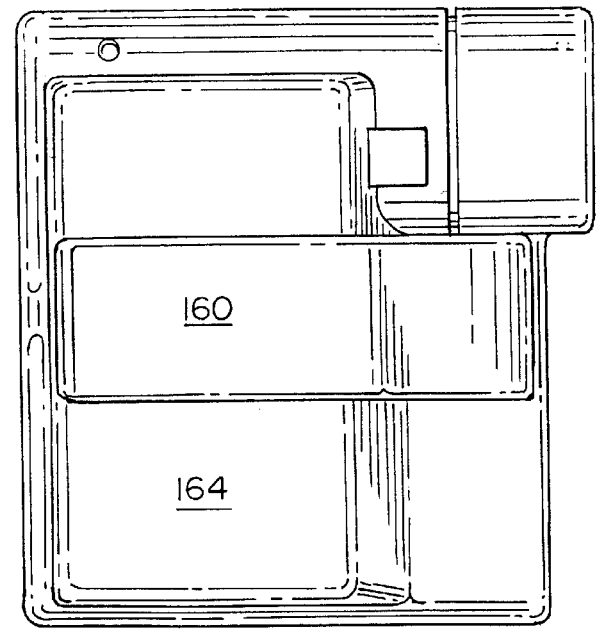

Another preferred embodiment of a hand-held viewing device 170 is illustrated in the perspective view of FIG. 4E. A first display is seen through lens 172 with magnification being adjusted by knob 174. A second display 180 as described above is positioned on the same side of the device 170 as the lens 172 for ease of viewing. The displays are operated by switch 176 and buttons or control elements 178. A top view is illustrated in FIG. 4F showing ridges 184 that accommodate the fingers of the user and the second display switch 182, which is shown more clearly in the side view of FIG. 46.

Rear and bottom views of device 170 show rear 188 and bottom 186 sides in FIGS. 4H and 4I, respectively.

Figure 5A:
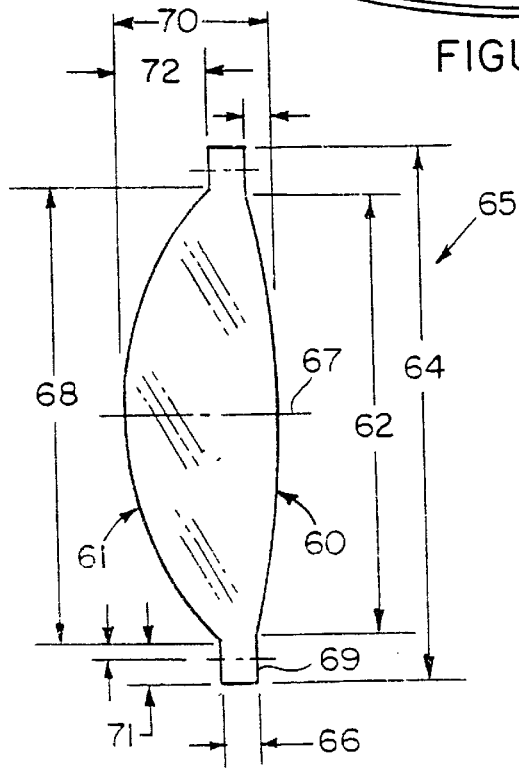
FIG. 5A is a side view of a lens suitable for magnifying a microdisplay in accordance with the invention.

A lens 65 suitable for magnifying the image of a microdisplay for viewing by a user is illustrated in the example of FIG. 5A.

For a 0.25 inch diagonal microdisplay, the outer diameter 64 of the lens can be about 30.4 mm, the thickness 70 of the lens at the optical axis 67 can be about 8 mm, the inner surface 60 that receives light from the display has a curved diameter of about 21.6 mm, and the viewing surface 61 has a diameter of 68 of about 22.4. The peripheral edge 69 used to hold the lens in the assembly can have a thickness 66 of about 2 mm and a radius 71 of about 4 mm. The lens 65 can be made of glass or a plastic material such as acrylic. This particular example of such a lens has a 16 degree field of view and an ERD of 25. The lens assembly can include an automatic focusing system, or a lens system that collapses in size when not in use.

Another preferred embodiment for providing a color display can use a diffraction optical system such as those described in application U.S. Ser. No. 08/565,058 filed on Nov. 30, 1995, the entire contents of which is incorporated herein by reference.

Figure 5B:
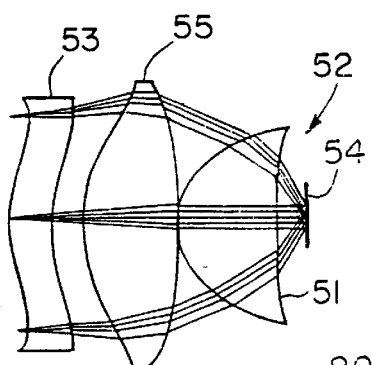
FIG. 5B is a side view of a multi element lens providing an increased field of view.

Another preferred embodiment of a 1.25 inch diameter lens system 52 with a larger field of view is illustrated in FIG. 5B. Three lens elements 51, 53 and 55 enlarge the image on the display 54.

Figure 5C:
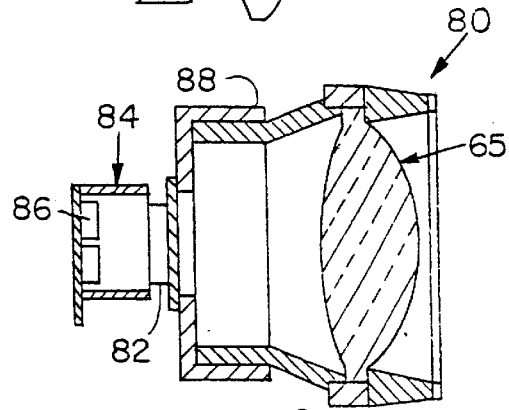
FIG. 5C is a cross-sectional view of a display assembly with a fixed lens.

The lens 65 of FIG. 5A can be used in the alternative display assembly of 80 of FIG. 5C. In this embodiment, the display 82 is positioned between the backlight housing 84, containing LED 86, and the lens housing 88 that holds the lens 65 in a fixed position relative to the display 82.

Figure 5D:
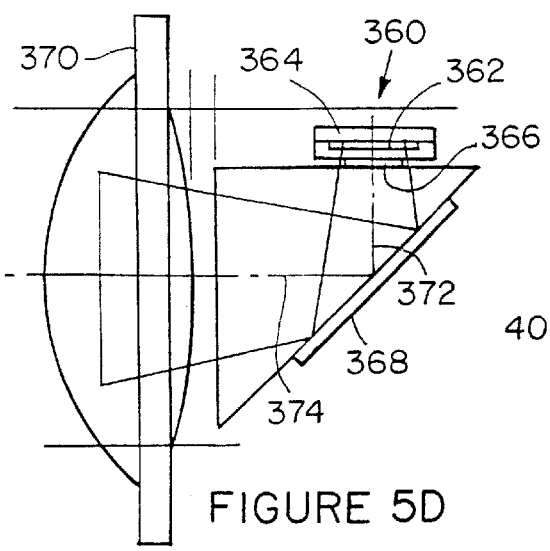
FIG. 5D is a schematic view of an LED backlighting system for a liquid crystal display in accordance with the invention.

A microdisplay system 300 utilizing a folded optical path is illustrated in connection with FIG. 5D. In this embodiment, an LED array 302, or other light source, illuminates the display within housing 304. The display 306 directs an image along a first optical path 312 that is reflected by mirror 308 along a second other path 314 through the lens 310 as described previously.

Lighting System for Reflective Liquid Crystal Display

Figure 6:
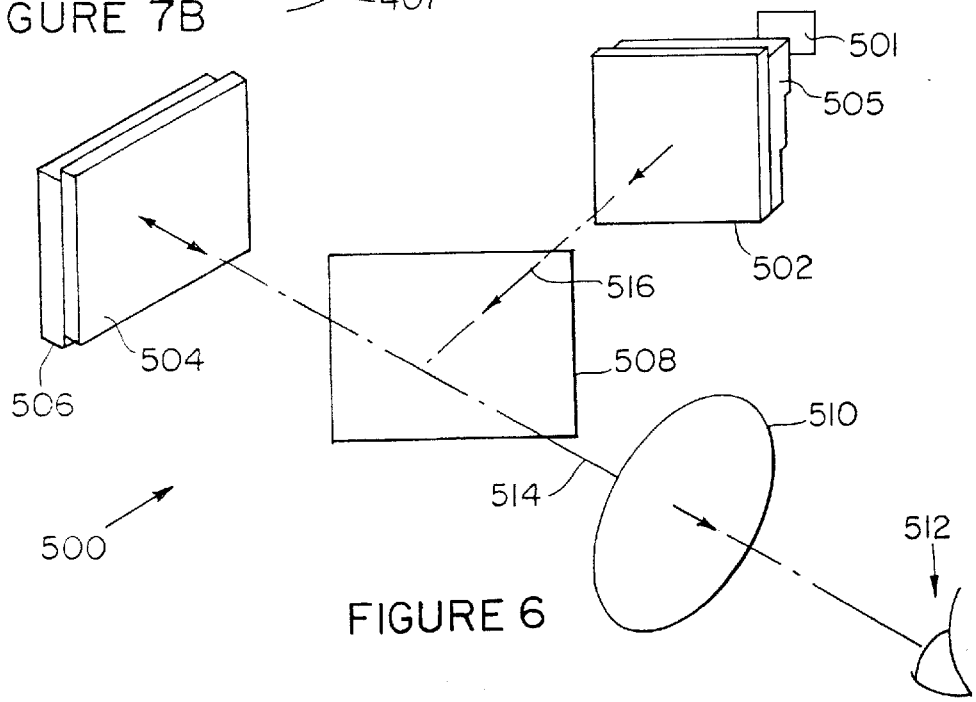
FIG. 6 is an optical diagram of a lighting system for a reflective liquid crystal display.

The details of a lighting system 102 for a reflective micro, display of the invention will now be described in connection with FIG. 6. Illumination for a reflective LCD system 500 based upon the active matrix circuit described heretofore in connection with FIG. 2 is provided by an array of Light Emitting Diodes (LED(s)) 501 disposed adjacent lightdiffuser 505 which uniformly transmits the source LED light to a linear polarizer 502.

The linear polarized light 516 from polarizer 502 is passed to a polarizing beamsplitter or prism 508 which is reflected by beam splitter 508 and is incident on specularly reflective LCD 506 to provide the requisite illumination. The light incident on LCD 506 is selectively reflected to generate an image that is rotated by ¼ wave plate 504 so that it is transmitted through splitter 508 and through lens 510 to the observer 512.

Figure 7A:
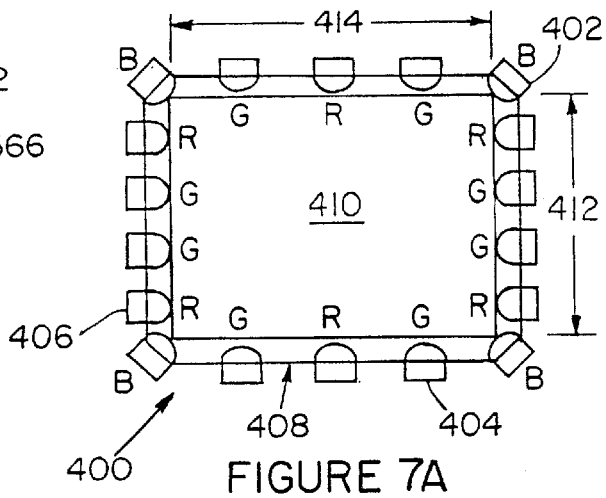
FIGS. 7A–7C illustrates preferred LED backlighting systems for a transmission type display.
Figure 7B:
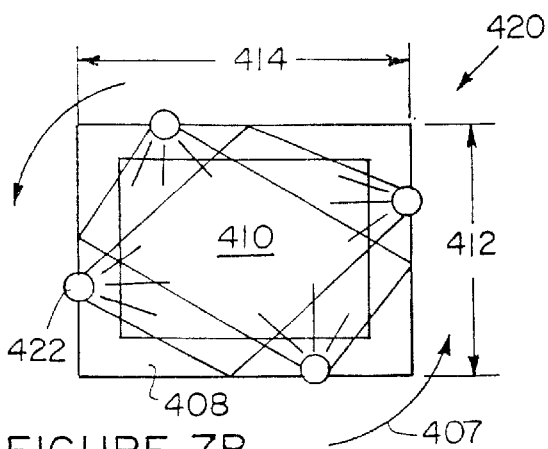
Figure 7C:
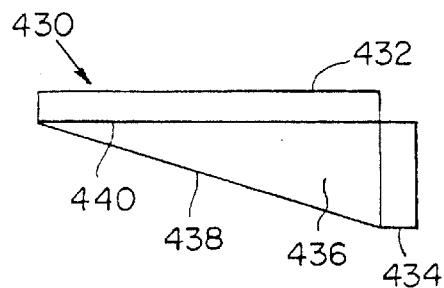

Shown in FIGS. 7A–7C are preferred embodiments of an LED backlighting system utilizing a diffuser for a transmission display in accordance with the invention. In a first embodiment of an LED illumination system 400 shown in FIG. 7A, blue (B)402, green (G)404, and red (R)406 LEDs are optically coupled to a flat diffuser element 408 around the periphery of an illumination area of 410 that is positioned adjacent the display active or viewing area. For a display having a diagonal of 6.35 mm, the side of 412 of the viewing area 410 can be about 3.81 mm in size, and the length 414 of the viewing area can be about 5.08 mm. The diffuser 408 can be a plastic material such as acrylic and the back of the diffuser can be coated with a reflective material to improve light output of the device.

In another embodiment of an LED display illumination system 420 as shown in FIG. 7B, the LED's 422 are coupled in pattern to the edge of the diffuser 408. The LEDs 422 are actuated in sequence 407 to provide color sequential operation with fewer LEDs.

In the system 430 of FIG. 7C, the display 432 is coupled to an angled diffuser 436 at interface 440. The linear array of LEDs 434 are coupled at one end of the diffuser and a reflective back surface is designed to evenly distribute light as it is directed through the interface.

Figure 8:
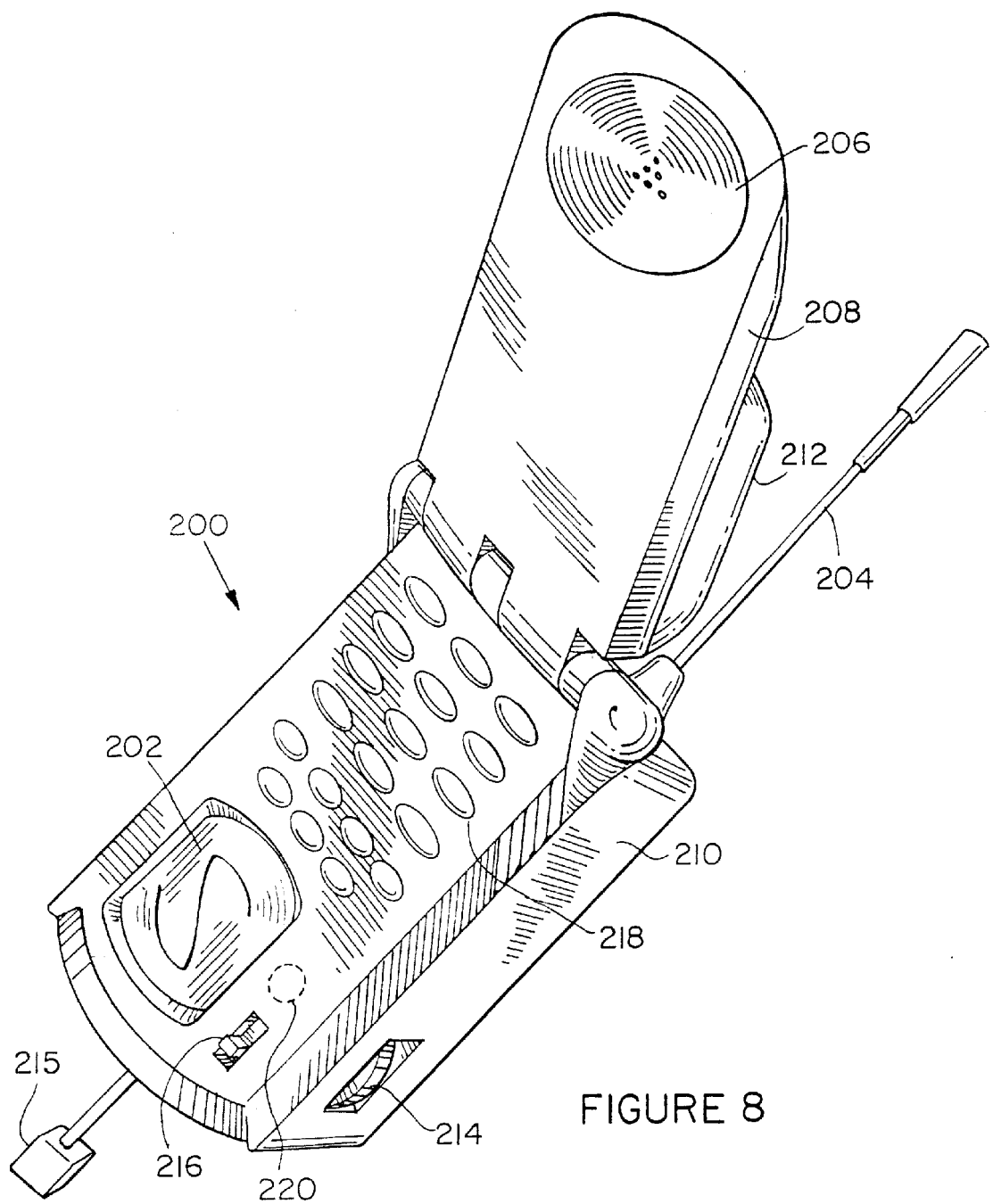
FIG. 8 is a perspective view of a preferred embodiment mobile telephone having a display device in accordance with the invention.

Illustrated in connection with FIG. 8 is a cellular telephone 200 having a magnified microdisplay in accordance with the invention. The display can be included in a base portion 210 of a "flip-phone" along with keypad 218 and microphone 220. The speaker 206, or the display or a second display as well as additional circuitry can be included in second portion 208 that rotates relative to the base 210. An antenna 204 can telescope out of the base for improved wireless reception. A battery is housed at 212. A lens 202 can be viewed by the user while holding the speaker to his or her ear thus enabling both viewing and voice transmission at the same time. The display can be turned on or off at switch 216 to save battery life when the display is not in use. The magnification can be adjusted at knob 214.

Additionally, a small camera 215 such as a charge coupled device (CCD) or other solid state imaging sensor can be mounted on a telescoping element to provide an imaging or video-conferencing capability. The camera can be pivoted so that the user can point and hold the camera in any selected direction. The image generated can be seen on the display and/or transmitted to a remote location, selected buttons or touch pad keys 218 can be used as a mouse control for the display.

Alternatively, the display can be formed in a modular component that snaps onto the base portion of a standard telephone and couples to a display circuit port in the base section of the telephone. This is illustrated in the preferred embodiments of FIGS. 9A–9J.

Figures 9A, 9B:
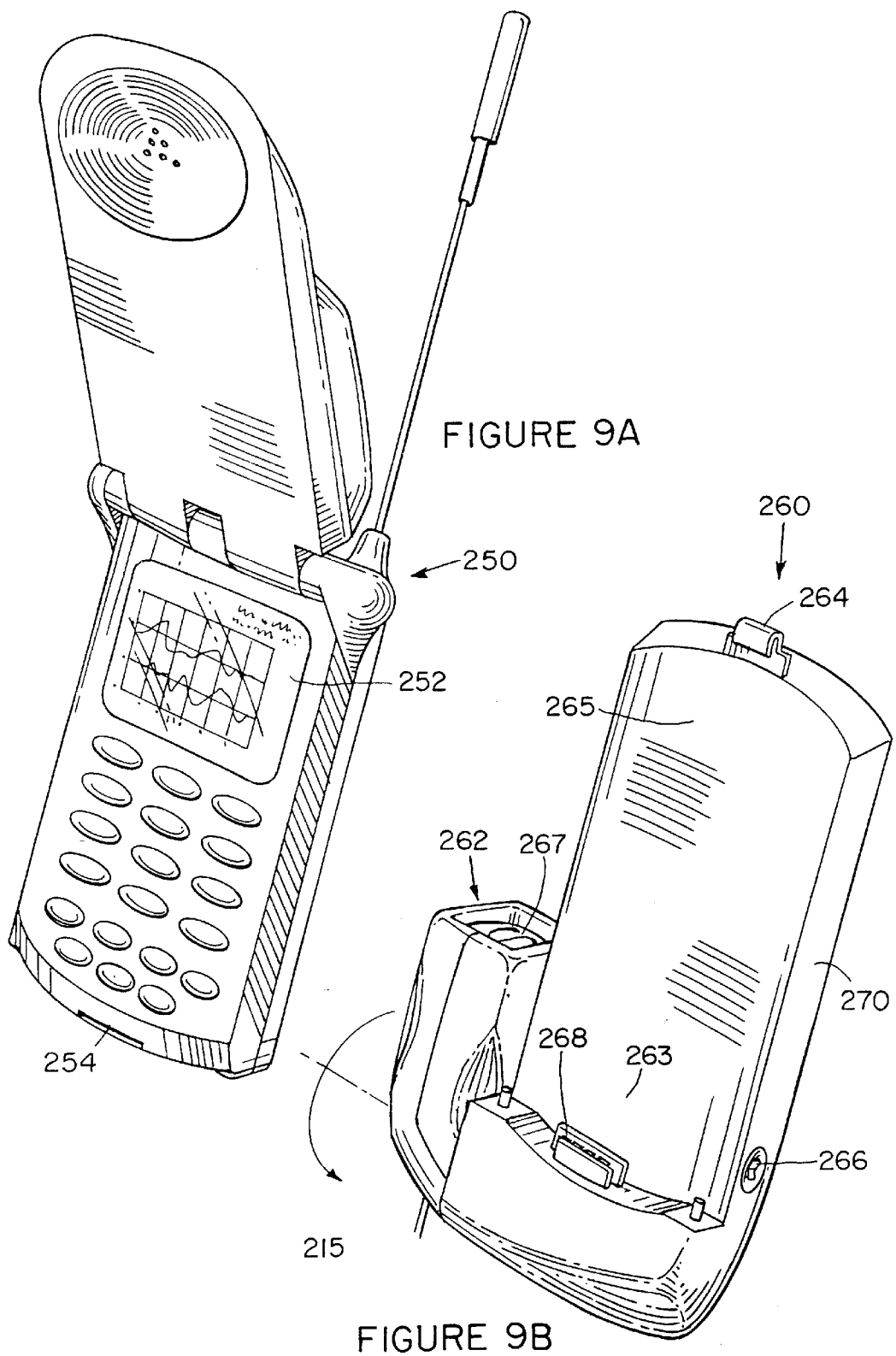

FIG. 9A shows a telephone 250 having standard features such as a display 252 and a port 254 for external communications. The modular display unit 260 shown in FIG. 9B is configured to dock with the telephone 250 wherein the connector 268 is inserted into port 254 and latch 264 connects to the top of the base section of telephone 250 thereby connecting the micro display within display subhousing 262 to the receiver within the telephone 250. The subhousing 262 pivots relative to main housing 270 to allow viewing of the display through lens 267 during use of the telephone 250. In this embodiment, telescoping camera 215 can extend from subhousing 262. Base 270 includes a second battery, drive electronics for the LED backlit LCD display on activation switch 266. FIG. 9C is a sideview of telephone 250 showing the battery housing 250 on the opposite side from the speaker 206. Back panel 258 is shown in the rear view of FIG. 9D along with second battery contacts 256 exposed thereon. When the telephone 250 is docked in unit 260, the surface 258 abuts surface 265 and connectors 263 are positioned against contacts 256 such that the telephone can be powered by the second battery in housing 270.

Figure 9H:
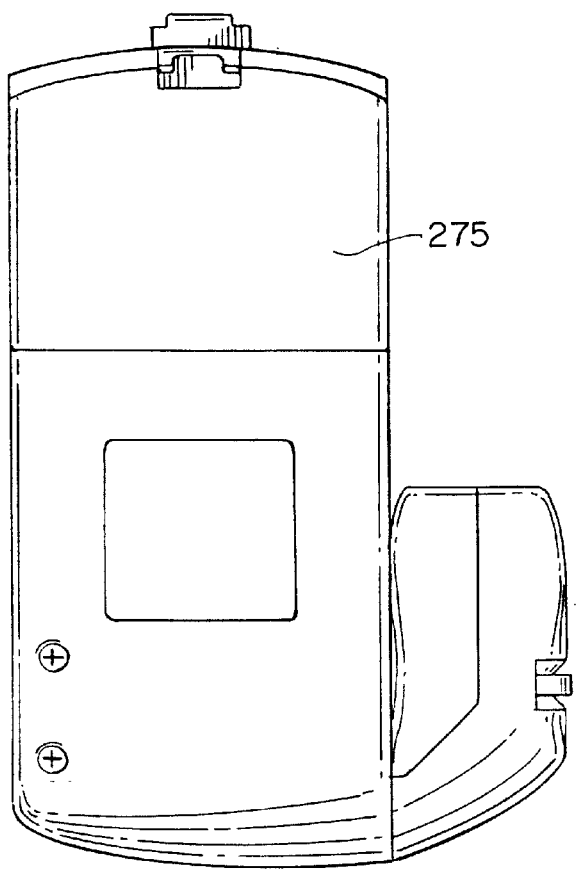
Figure 9I:
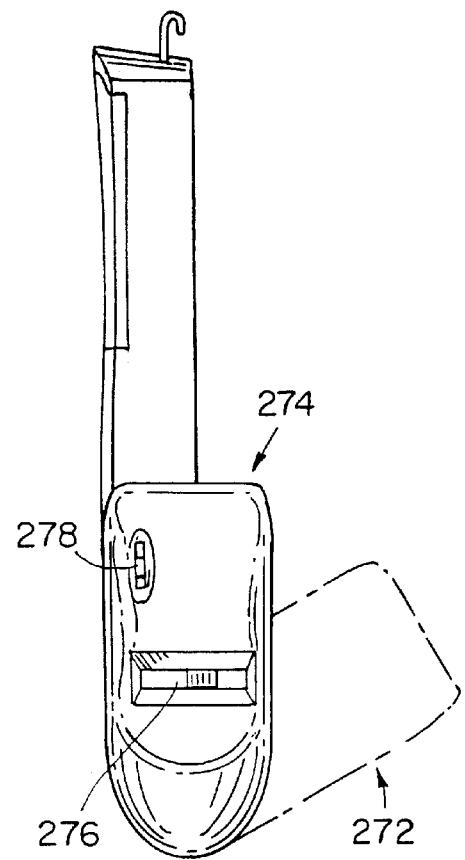

FIGS. 9E, 9F and 9G illustrate top front and side views of unit 260 where the subhousing is shown in both its storage position 274 and its viewing position 272. FIGS. 9H and 9I show back and second side views of unit 260 and illustrate battery access panel 275, focus know 276 and control buttons 278 that are exposed on the side of housing 270 when the sub-housing 262 is rotated to the viewing position 272.

Figure 9J:
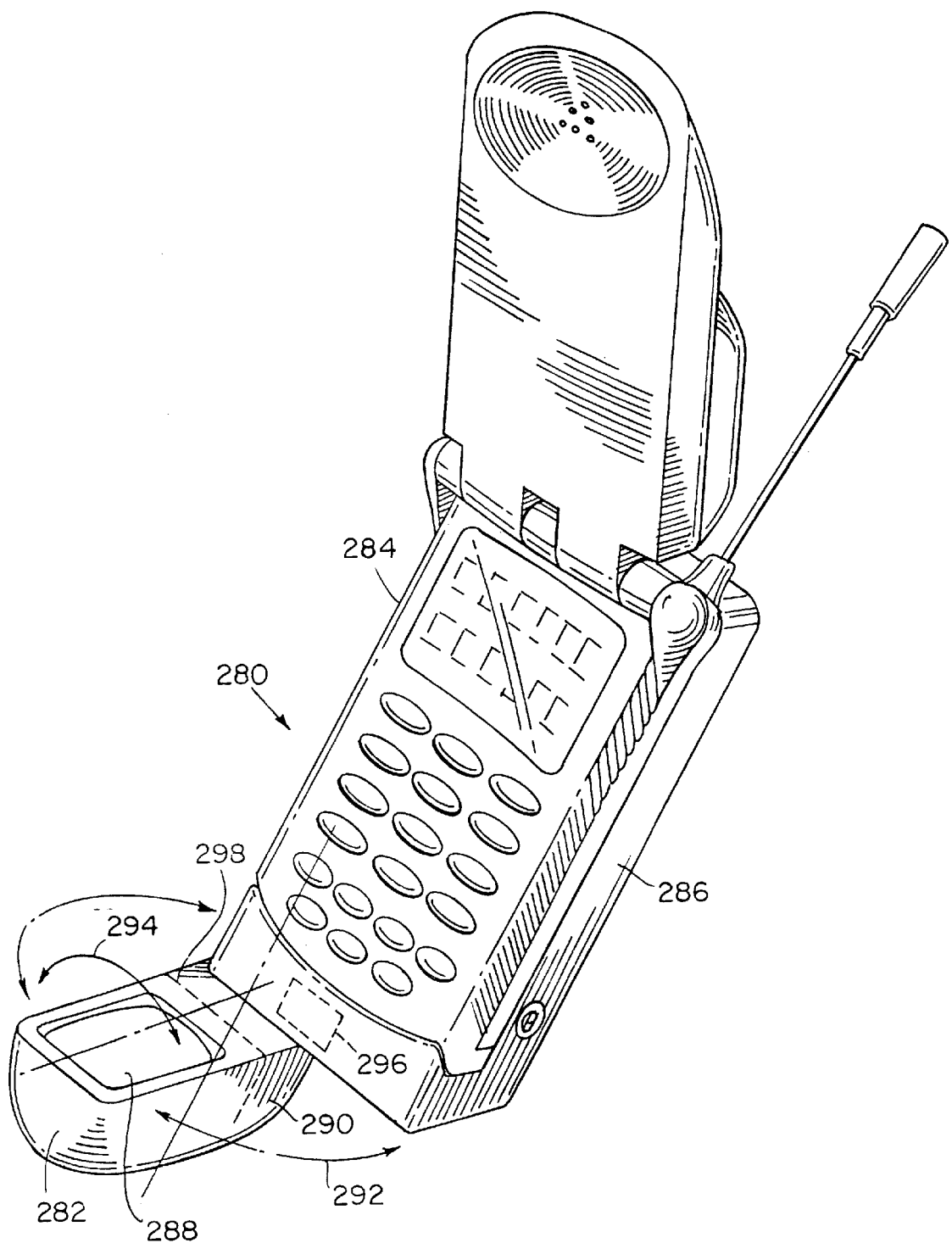

In the embodiment 280 shown in FIG. 9J the telephone 284 is shown docked with housing 286. However in this embodiment, the display is mounted withing a pivoting unit 282. The user can swing unit 282 along arc 292 to expose viewing lens 288. The user can also swing the display around a second orthogonal axis 294 at joint 298 so that the display rotates into a variety of viewing positions relative to hinge section 290.

Figure 10C:
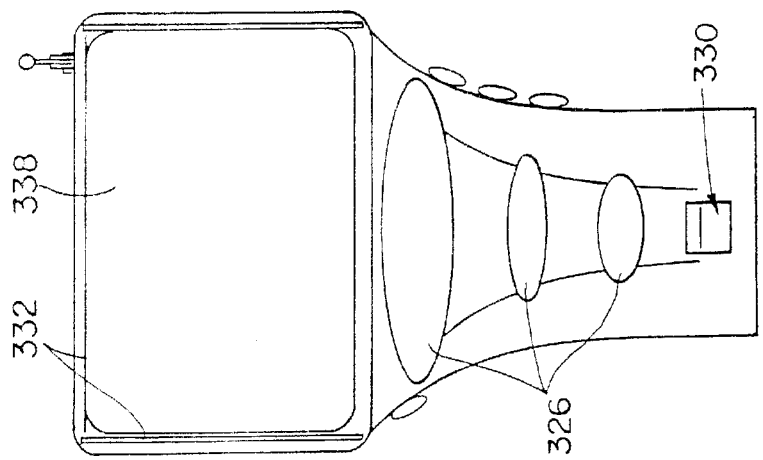
FIGS. 10A–10C are side cross-sectional, front, and front cross-sectional views of a hand held rear projection display system in accordance with the invention.
Figure 10B:
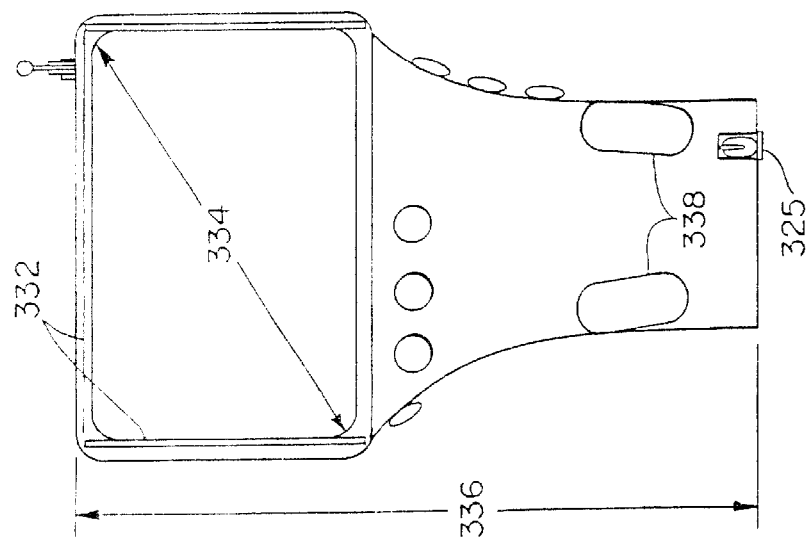
Figure 10A:
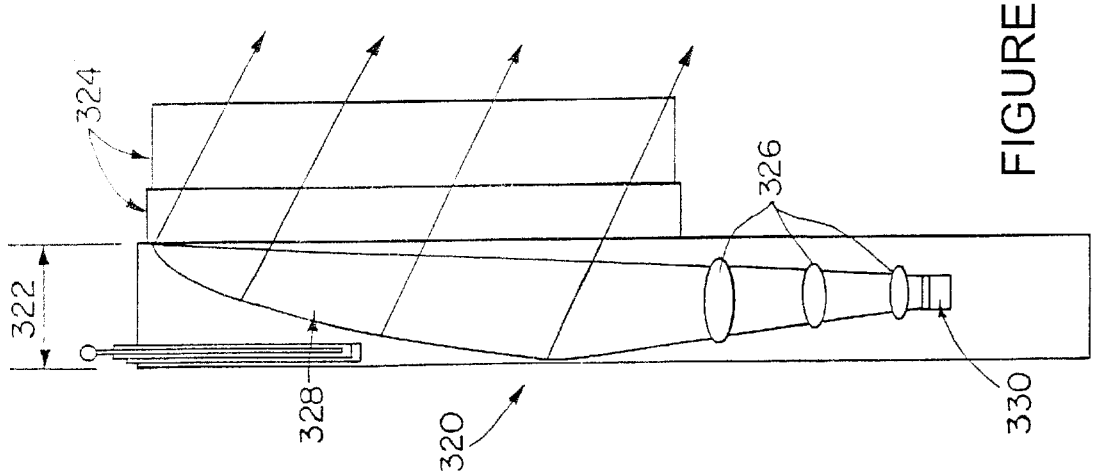

FIGS. 10A, 10B and 10C show side cross-sectional, front and front cross-sectional views of a hand-held rear projection system 320 using a microdisplay. The system 320 includes a microdisplay and backlight assembly 330, a projection lens system 326, a reflective screen 328 and optional retractable sun screens 324. The device has a thickness 322 of less than 2 inches, preferably about 1 inch, a height 336 of less than 8 inches, preferably about 5–6 inches and a display diagonal 334 of 4 inches or less, preferably about 3 inches. This provides a system volume that is preferably less than about 40 inches. The rear reflective screen 328 is shown in the front view of FIG. 10C at 338 and are surrounded on 3 sides by retractable shades 332 (324). The handle portion can include speakers 338 and an earphone jack 325.

Figure 11B:
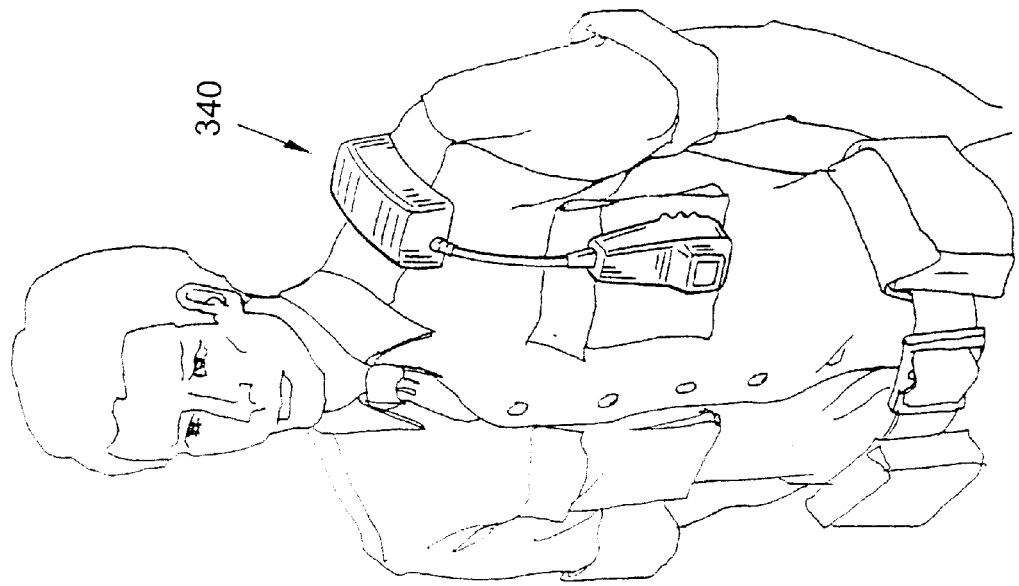
FIGS. 11A–11B illustrate a body worn, hand operated display system in accordance with the invention.
Figure 11A:
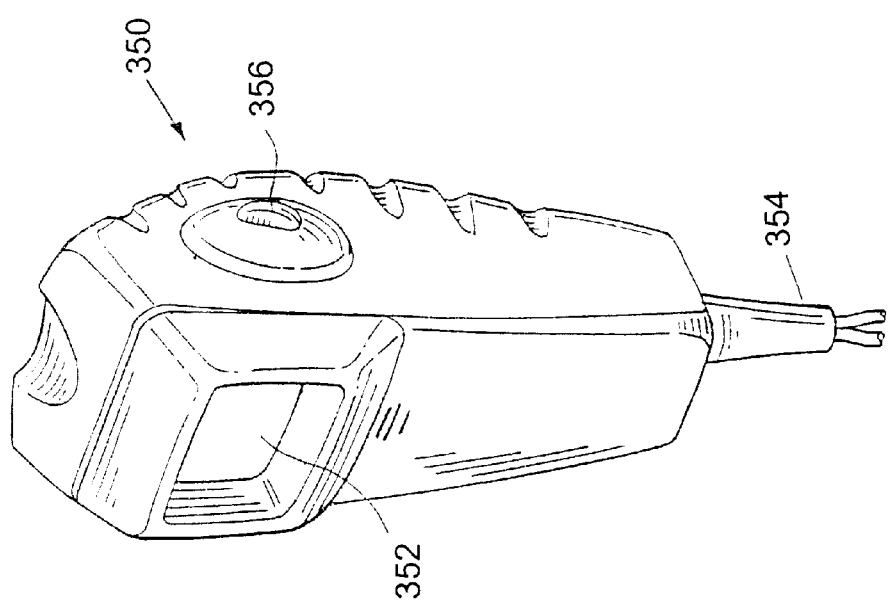

A body worn hand-held display system is shown in FIGS. 11A and 11B. The hand-held unit 350 includes a microdisplay viewed through port 352 that is controlled by control element 356 and connected by cable 354 to a body worn communications pod 340.

Head Mounted Display System

In yet another embodiment of the invention shown in FIG. 12A, the HDTV color active matrix display, as described in connection with FIG. 2, is provided with suitable optics and incorporated into a housing 860 and pivotally attached to a headband frame 861 to provide a novel head mounted display system 864. In general, the system 864 is comprised of a unique headband frame 861 and adjustable strap 862 for attaching the system to the user's head, a side-mounted speaker system 866 connected by cable 868 to electronics console 870 attached to the front of the frame 862, a microphone 872 rotatably suspended from speaker frame 874, and the aforementioned display housing 860 dependent from console 870 and electronically connected thereto by cable 876.

Figure 12A:
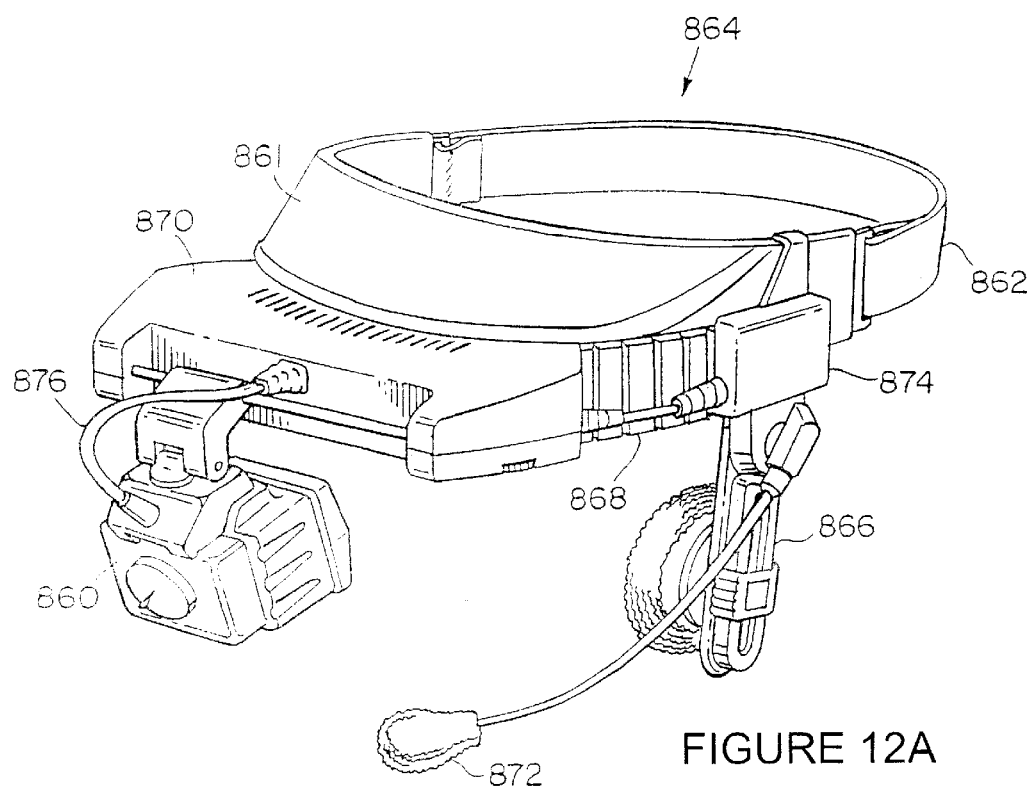
FIG. 12A is a perspective view of a head-mounted display system of the invention.
Figure 12B:
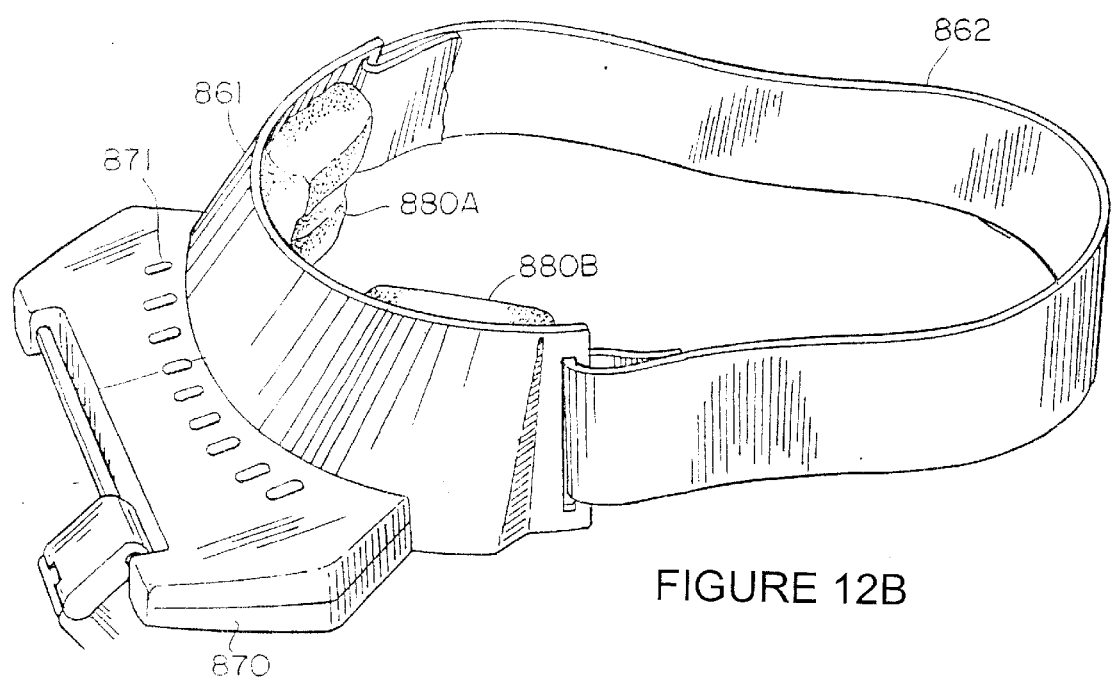
FIG. 12B is a partial schematic perspective view of the system of FIG. 12A emphasizing additional features of the invention.
Figure 12C:
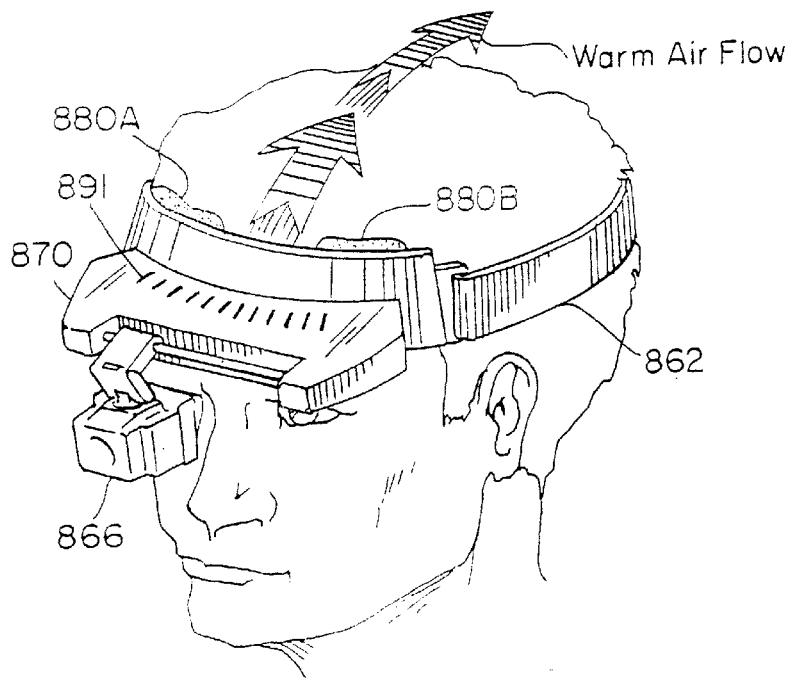
FIG. 12C is a schematic perspective of the system of FIG. 12A which emphasizes certain aspects of the invention.
Figure 12D:
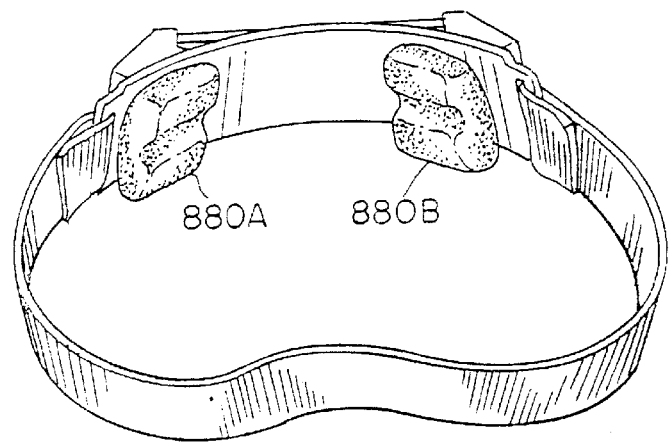
FIG. 12D is a schematic perspective view of the headband and pads of FIG. 12C.
Figure 12E:
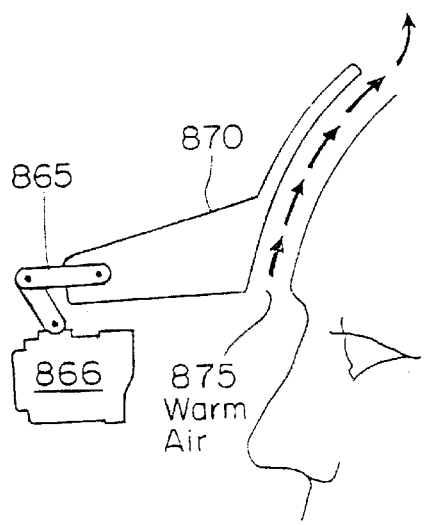
FIG. 12E is a partial schematic side view of the system of FIG. 12A.

Not shown in FIG. 12A is a headband system comprised of two or more pads 180A, 180B, as shown in FIGS. 12B–12E.

To allow for the broadest range of head sizes, the headband frame 861 utilizes two contoured foam pads 880A and 880B, angled, and spaced apart such that both small and large forehead curvature are accommodated. Each foam pad also has two primary contact areas 881 and 883, that act in the same way. When combined with a strap 862 placed below the ball formed at the rear of the head, the net effect is that the headband frame 861 is securely located on the wearer's forehead 887 whether child or adult.

When the electronics are used, there is some heat being generated in the main housing or console 870. Prior art headbands used wide forehead pads which effectively trapped this heat at the wearer's brow. This proved to be quite uncomfortable after extended wear.

The foam pads 880A and 880B displace the headband frame 861 from the user's forehead 887 leaving a gap therebetween which serves as a warm air vent 875 to dissipate warm air generated by the electronics in console 870.

This new embodiment provides a "chimney-like effect" that effectively vents the warm air away from the wearer's face. The foam pads are removably attached, as by Velcro® type fasteners, and covered with terrycloth 861 for improved comfort. Optional additional vents 871 are provided in the console 870.

Equivalents

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A microdisplay system comprising:
   an active matrix liquid crystal display including an array of pixel electrodes;
   a light emitting diode device having at least two light emitting diodes of different colors that illuminates the array of pixel electrodes sequentially;
   a diffuser interposed between the light emitting diode device and the active matrix liquid crystal display for distributing the illumination; and
   a lens positioned to receive an image formed on the active matrix liquid crystal display and that focuses an image on the display for viewing by a user and magnifies the image by at least a factor of two.

2. The microdisplay system of claim 1 wherein the array of pixel electrodes comprises an array of at least 320×240.

3. The microdisplay system of claim 1 wherein the array of pixel electrodes comprises an array of at least 640×480.

4. The microdisplay system of claim 1 wherein the light emitting diode device comprises a backlight that transmits light through the active matrix liquid crystal display.

5. The microdisplay system of claim 1 wherein the active matrix liquid crystal display further comprises an array of transistor circuits formed with single crystal silicon, the array of transistor circuits being bonded to an optically transmissive substrate with an adhesive layer.

6. The microdisplay system of claim 1 further comprising a cellular receiver.

7. The microdisplay system of claim 1 wherein the system is contained within a housing having a volume of less than 1000 cm$^3$.

8. The microdisplay system of claim 1 wherein the array of pixel electrodes includes at least 75,000 pixel electrodes and has an active area of less than 10 mm$^2$.

9. The microdisplay system of claim 8 wherein each pixel electrode has a width of less than about 10 microns.

10. The microdisplay system of claim 8 wherein the array of pixel electrodes has an active area of less than 5 mm$^2$.

11. The microdisplay system of claim 10 wherein each pixel electrode has a width of less than about 8 microns.

12. A microdisplay pager comprising:

a pager housing;

an active matrix liquid crystal display within the pager housing and including an array of pixel electrodes;

a light emitting diode device that transmits light through the array of pixel electrodes to provide a display lightsource;

a diffuser interposed between the light emitting diode device and the active matrix liquid crystal display for distributing the illumination;

a lens positioned within the housing to receive an image formed on the active matrix liquid crystal display and that focuses the image on the display for viewing by a user;

a receiver within the housing to receive image signals from an external source; and a display circuit within the housing that is connected to the receiver and the liquid crystal display.

13. The pager of claim 12 wherein the array of pixel electrodes comprises an array of at least 320×240.

14. The pager system of claim 12 wherein the array of pixel electrodes comprises an array of at least 640×480.

15. The pager of claim 12 wherein the light emitting diode device comprises a backlight that transmits light through the active matrix liquid crystal display.

16. The pager of claim 12 wherein the active matrix liquid crystal display further comprises an array of transistor circuits formed with single crystal silicon, the array of transistor circuits being bonded to an optically transmissive substrate with an adhesive layer.

17. The pager of claim 12 further comprising a cellular receiver.

18. The pager of claim 12 wherein the pager housing has a volume of less than 1000 $cm^3$.

19. The pager of claim 12 wherein the array of pixel electrodes includes at least 75,000 pixel electrodes and has an active area of less than 10 $mm^2$.

20. The pager of claim 19 wherein each pixel electrode has a width of less than about 10 microns.

21. The pager of claim 19 wherein the array of pixel electrodes has an active area of less than 5 $mm^2$.

22. The pager of claim 19 wherein each pixel electrode has a width of less than about 8 microns.

23. A cellular telephone comprising:

a telephone housing having a plurality of control elements;

an active matrix liquid crystal display within the housing and including an array of pixel electrodes;

a light emitting diode device that illuminates the array of pixel electrodes;

a diffuser interposed between the light emitting diode device and the active matrix liquid crystal display for distributing the illumination; and a lens positioned to receive an image formed on the active matrix liquid crystal display and that focuses the image on the display for viewing by a user.

24. The cellular telephone of claim 23 wherein the array of pixel electrodes comprises an array of at least 320×240.

25. The cellular telephone of claim 23 wherein the array of pixel electrodes comprises an array of at least 640×480.

26. The cellular telephone of claim 23 wherein the active matrix liquid crystal display further comprises an array of transistor circuits formed with single crystal silicon, the array of transistor circuits being bonded to an optically transmissive substrate with an adhesive layer.

27. The cellular telephone of claim 23 further comprising a transmitter.

28. The cellular telephone of claim 23 wherein the system is contained within a housing having a volume of less than 1000 $cm^3$.

29. The cellular telephone of claim 23 wherein the array of pixel electrodes includes at least 75,000 pixel electrodes and has an active area of less than 10 $mm^2$.

30. The cellular telephone of claim 29 wherein each pixel electrode has a width of less than about 10 microns.

31. The cellular telephone of claim 29 wherein the array of pixel electrodes has an active area of less than 5 $mm^2$.

32. The cellular telephone of claim 31 wherein each pixel electrode has a width of less than about 8 microns.

33. A wireless telephone comprising:

a telephone housing having a plurality of control elements;

an active matrix liquid crystal display within the housing and including an array of pixel electrodes;

a light emitting diode device that illuminates the array of pixel electrodes to provide a display backlight;

a lens positioned to receive an image formed on the matrix display and that focuses the image on the display for viewing by a user;

a receiver within the housing to receive image signals from an external source; and a display circuit within the housing that is connected to the receiver and the liquid crystal display.

34. A wireless telephone as in claim 33, wherein the backlight is optically coupled to the matrix display with a side illumination device.

35. A wireless telephone as in claim 34, wherein the lens is hidden from a user in the storage position and is viewable in the operating position.

36. A wireless telephone as in claim 33, wherein the telephone has both a low resolution alphanumeric display and a high resolution display.

37. The wireless telephone of claim 33 wherein the array of pixel electrodes includes at least 75,000 pixel electrodes and has an active area of less than 10 $mm^2$.

38. The wireless telephone of claim 37 wherein each pixel electrode has a width of less than about 10 microns.

39. The wireless telephone of claim 37 wherein the array of pixel electrodes has an active area of less than 5 $mm^2$.

40. The wireless telephone of claim 39 wherein each pixel electrode has a width of less than about 8 microns.

41. A method of displaying an image on a wireless telephone, comprising receiving audio and image data with a transceiver, and operating a display control circuit connected to the transceiver and a matrix display to display an image on the display, the matrix displaying include an array of pixel electrodes.

42. A method of displaying an image on a wireless telephone as in claim 41 further comprising generating image data with a camera.

43. A method of displaying an image on a wireless telephone as in claim 42 further comprising selecting whether the image from the camera is seen on the display, transmitted to a remote location, or both.

44. A method of displaying an image on a wireless telephone as in claim 41 wherein the array of pixel electrodes includes at least 75,000 pixel electrodes and has an active area of less than 10 mm$^2$.

45. A method of displaying an image on a wireless telephone as in claim 44 wherein each pixel electrode has a width of less than about 10 microns.

46. A method of displaying an image on a wireless telephone as in claim 44 wherein the array of pixel electrodes has an active area of less than 5 mm$^2$.

47. The method of claim 46 wherein each pixel electrode has a width of less than about 8 microns.

* * * * *